US008565273B2

(12) United States Patent
Kitabayashi

(10) Patent No.: US 8,565,273 B2
(45) Date of Patent: Oct. 22, 2013

(54) OPTICAL FIBER LASER

(75) Inventor: Tomoharu Kitabayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/586,542

(22) Filed: Aug. 15, 2012

(65) Prior Publication Data
US 2012/0307848 A1 Dec. 6, 2012

Related U.S. Application Data

(60) Division of application No. 12/859,604, filed on Aug. 19, 2010, now Pat. No. 8,270,442, which is a continuation of application No. PCT/JP2009/052918, filed on Feb. 19, 2009.

(30) Foreign Application Priority Data

Feb. 19, 2008 (JP) ................................ 2008-038005

(51) Int. Cl.
*H01S 3/30* (2006.01)
(52) U.S. Cl.
USPC .................................. 372/6; 372/94
(58) Field of Classification Search
USPC .......................................... 372/6, 94
See application file for complete search history.

(56) References Cited

U.S. PATENT DOCUMENTS

| 5,864,644 | A | 1/1999 | DiGiovanni et al. |
| 7,171,091 | B1 | 1/2007 | Ward |
| 2001/0026667 | A1 | 10/2001 | Kawanishi et al. |
| 2002/0114602 | A1 | 8/2002 | Tardy et al. |
| 2003/0133477 | A1* | 7/2003 | Lin ................................. 372/6 |
| 2005/0207455 | A1 | 9/2005 | MacCormack et al. |
| 2006/0078009 | A1 | 4/2006 | Katayama et al. |
| 2006/0098694 | A1 | 5/2006 | Hongo |
| 2006/0209908 | A1 | 9/2006 | Pederson et al. |
| 2007/0104431 | A1 | 5/2007 | Di Teodoro et al. |
| 2007/0189339 | A1 | 8/2007 | Matsuda et al. |

FOREIGN PATENT DOCUMENTS

| GB | 2418526 A | 3/2006 |
| JP | 03-242627 A | 10/1991 |
| JP | 05136498 A | 6/1993 |

(Continued)

OTHER PUBLICATIONS

Michihiro Nakai et al, "30W Q-SW fiber laser", Proc. of SPIE vol. 6453, 645319-1 to 645319-9.
Office Action issued Mar. 7, 2012 by the State Intellectual Property Office of the People's Republic of China in counterpart Chinese Reference No. 200980105723.5.

(Continued)

*Primary Examiner* — Yuanda Zhang
(74) *Attorney, Agent, or Firm* — Sughrue Mion, PLLC

(57) ABSTRACT

An optical fiber laser including: a master oscillator; and a power amplifier, the power amplifier including: a plurality of excitation light sources; excitation ports each of which is connected to the excitation light sources and which an excitation light emitted from each of the excitation light source enters; a signal port which a laser beam emitted from the master oscillator enters; an optical coupler with an exit port that outputs the excitation lights from the excitation ports together with the laser beam from the signal port; and an optical fiber connected to the exit port, in which the optical fiber is a photonic bandgap fiber, and the optical fiber has a loss wavelength characteristic in that a photonic bandgap region is narrower than a gain wavelength band in a graph with an axis of abscissa representing a wavelength and an axis of ordinate representing a loss amount.

9 Claims, 15 Drawing Sheets

(56) References Cited

FOREIGN PATENT DOCUMENTS

| JP | 2653936 B2 | 9/1997 |
|----|------------|--------|
| JP | 10056227 A | 2/1998 |
| JP | 2977053 B2 | 11/1999 |
| JP | 2003-035919 A | 2/2003 |
| JP | 2007-42981 A | 2/2007 |
| JP | 2007208107 A | 8/2007 |
| JP | 2007316526 A | 12/2007 |
| WO | 2007/044789 A2 | 4/2007 |

OTHER PUBLICATIONS

He, Li et al. "Characteristics of Photonic Crystal Fiber and Its Application in Optical Communication", Acta Sinica Quantum Optica, vol. 12, No. 4, pp. 225-230.

"Solid Photonic Band-Gap Fiber with 400 nm Bandwidth and Loss below 4 dB/km at 1520 nm," Optical Society of America, o. 1-3, Oct. 2007.

International Search Report issued in International Application No. PCT/JP2009/052918 dated Mar. 17, 2009.

Extended European Search Report for European Application No. 09712490.3 dated Aug. 2, 2013.

* cited by examiner

US 8,565,273 B2

OPTICAL FIBER LASER

CROSS REFERENCE TO RELATED APPLICATIONS

This is a divisional of application Ser. No. 12/859,604 filed Aug. 19, 2010, which is a continuation application based on a PCT Patent Application No. PCT/JP2009/052918, filed Feb. 19, 2009, whose priority is claimed on Japanese Patent Application No. 2008-038005 filed Feb. 19, 2008, the entire content of which are hereby incorporated by reference.

BACKGROUND OF THE INVENTION

1. Field of the Invention

The present invention relates to an optical fiber laser, more particularly to an optical fiber laser in which a photonic bandgap fiber adjusted to produce a photonic bandgap region only in a signal wavelength region is used, and a parasitic oscillation is suppressed.

2. Description of the Related Art

Recent years have seen advances in the high output of fiber lasers. Optical fiber lasers with an output over kW have been developed. Such optical fiber lasers with a high output have come to be utilized in a variety of fields such as in finishing machines, medical equipment, and measuring equipment. Compared with other types of lasers, the optical fiber lasers have an excellent capability to collect light, and hence, are capable of obtaining a very small beam spot with a high power density. Therefore, the optical fiber lasers allow high-precision machining. Machining that uses the optical fiber laser is non-contact machining, and is also capable of machining a hard substance if the substance is capable of absorbing a laser beam. For these and other reasons, the range of applications of the optical fiber lasers is rapidly increasing especially in the field of material machining.

FIG. 14 shows a schematic diagram of a representative high-output optical fiber laser with a system called the MOPA.

In the MOPA system, to the subsequent stage of a master oscillator (hereinafter, sometimes referred to as MO) 100, a power amplifier (hereinafter, sometimes referred to as PA) 200 is connected. With this configuration, a feeble pulsed beam that has been output from the MO 100 is amplified by the PA 200, and a laser beam with a high output is emitted from the PA 200. If a sufficient output is not obtained with a single-stage PA 200, PAs 200 are connected in multiple stages so as to obtain a desired output.

Systems for the MO 100 include: a system in which an output of a CW-oscillating laser light source such as a semiconductor laser is modulated in intensity with a modulator such as an acoustooptical element into pulsed light; and a system in which a fiber ring laser is used such as described, for example, in Patent Document 1.

FIG. 15 shows a schematic block diagram of a representative fiber ring laser.

A fiber ring laser 100 comprises: an excitation light source 101; a WDM coupler 102 for combining an excitation light with a laser beam; a rare-earth-doped optical fiber 103, the rare earth being a gain medium; an isolator 104; an optical switch element 107; and an output coupler 105. The excitation light emitted from the excitation light source 101 enters the rare-earth-doped optical fiber 103 via the WDM coupler 102. The excitation light having entered the rare-earth-doped optical fiber 103 is absorbed into the rare-earth ions doped in the core of the rare-earth-doped optical fiber, to thereby excite the rare-earth ions. The rare-earth ions in the excited state emit spontaneous emission with a specified wavelength. While being amplified, the spontaneous emission propagates through the rare-earth-doped optical fiber 103, and is output as an Amplified Spontaneous Emission (ASE). The WDM coupler 102, the rare-earth-doped optical fiber 103, the isolator 104, the output coupler 105, and the optical switch element 107 are connected in a ring. Therefore, the ASE circulates through these parts, and is again amplified by the rare-earth-doped optical fiber 103. After sufficiently amplified, the ASE laser-oscillates, a part of which is output as a laser beam via the output coupler 105. At this time, if the optical switch element 107 is operated so as to periodically repeat a low loss state and a high loss state, the ASE pulse-oscillates. Thus, a pulse laser output is obtained.

For the PA 200, an amplifier with a configuration as shown in FIG. 16 is used. FIG. 16 shows a configuration of an optical fiber laser with the MOPA system. The laser beam that has been output from the MO 100 enters the PA 200 via an interstage isolator 316, and is output after amplification by the PA 200.

The PA 200 includes: a plurality of excitation light sources 201; an optical coupler 203; a rare-earth-doped optical fiber (rare-earth-doped double-clad fiber) 210; and an isolator 206. As for the excitation light sources 201, the rare-earth-doped optical fiber 210, and the isolator 206, the same ones as those used in the MO 100 may be used. For the optical coupler 203, an optical coupler such as described in Patent Document 2 is used. The optical coupler 203 has: a plurality of excitation ports 202 made of a multi-mode optical fiber; and a signal port 204 made of a single-mode fiber; and further has an exit port 205 that is formed by fusing and drawing the multi-mode optical fiber and the single-mode fiber into an integrated entity. The laser beam emitted from the MO 100 enters at the signal port 204 and is emitted to the core of the rare-earth-doped double-clad fiber 210 via the optical coupler 203. On the other hand, to the optical coupler 203, a plurality of the excitation ports 202 are connected. To each of the excitation ports 202, an excitation light source 201 is connected. Each of the excitation light emitted from each excitation light source 201 enters the first cladding of the rare-earth-doped double-clad fiber 210 via the optical coupler 203. The excitation lights having entered the first cladding are absorbed into the rare-earth ions doped in the core, and a population inversion is formed, to thereby produce stimulated emission. With the stimulated emission, the laser beam propagating through the core is amplified, and is then output via the isolator 206.

In the case of the MO 100 with the MOPA system as shown in FIG. 16, if the rare-earth-doped double-clad fiber 210 of the PA 200 is excited, in a state with signal light not being incident from the MO 100, by the excitation lights emitted from the excitation light sources 201 and reaches a specified population inversion ratio, a parasitic oscillation occurs, and pulses with a very high peak value are generated. The population inversion ratio at which a parasitic oscillation occurs is determined by the reflectances on the entrance side and the exit side of the rare-earth-doped double-clad fiber 210. At some of the population inversion ratios, pulses with a very high peak value by the parasitic oscillation are emitted from the rare-earth-doped double-clad fiber 210 to the optical coupler 203. At this time, there have been problems in that the core of the rare-earth-doped double-clad fiber 210 is damaged by pulses with a very high peak value and that the pulses reach the excitation light source 201 and the MO 100 and thereby damage the excitation light source 201 and the MO 100.

Furthermore, even in the state where pulses are emitted from the MO 100 with a cycle that does not produce a parasitic oscillation in the PA 200, and the optical fiber laser functions normally, there may be a case where reflected light from the outside of the PA 200 output induces a parasitic oscillation while the pulses are input. Normally, the excitation light source 201 of the PA 200 emits the excitation light between the pulses. Therefore, the rare-earth-doped double-clad fiber 210 is in an excited state. Consequently, the ASE is emitted from both sides of the rare-earth-doped double-clad fiber 210. For example, in the case where the optical fiber laser is applied to a material machining, the ASE is emitted onto the material to be machined from the optical fiber laser. At this time, in some of the surface states of the material to be machined, the light reflected off the surface of the material to be machined may again enter the optical fiber laser. Then, an oscillation occurs with this reflected light functioning as seeds, and pulses with a very high peak value are emitted from the rare-earth-doped double-clad fiber 210 to the optical coupler 203. This brings about a problem in that the pulses reach the excitation light sources 201 and the MO 100 and thereby damage the excitation light source 201 and the MO 100.

As described above, in conventional optical fiber lasers, a parasitic oscillation occurs. This has prevented a high population inversion ratio from being achieved, and hence, the energy of the pulse capable of being output from the PA 200 has been limited.

To solve these problems, an isolator is inserted into both sides of the rare-earth-doped optical fiber, to thereby keep the reflectance low and suppress the parasitic oscillation, for example, in the method described in Patent Document 3. Furthermore, a short wavelength pass filter is provided on the exit end of the excitation light source, to thereby prevent the ASE emitted from the rare-earth-doped optical fiber from entering again the rare-earth-doped optical fiber after reflection by the pump laser. That is, in the optical fiber laser described in Patent Document 3, the reflectances on the entrance side and the exit side of the rare-earth-doped optical fiber are suppressed as much as possible, to thereby suppress the parasitic oscillation.

Furthermore, for example, in the method described in Patent Document 4, an optical fiber amplifier is divided into two stages, and an isolator is provided between the stages. At the previous stage of the optical fiber amplifier, a gain thereof is kept low, to thereby suppress a parasitic oscillation. On the other hand, at the subsequent stage of the optical fiber amplifier, a gain thereof is high. However, the ASE emitted from the previous stage of the optical fiber amplifier is always incident therein. Therefore, in the optical fiber laser described in Patent Document 4, an amplification of the ASE is produced, but this does not lead to a parasitic oscillation.

In the optical fiber laser described in Patent Document 5, a fiber Bragg grating (hereinafter, sometimes referred to as FBG) is provided on both ends of a rare-earth-doped double-clad fiber, to thereby construct a resonator. Furthermore, to one of the FBGs, there is connected a multi-mode fiber. An excitation light from an excitation light source enters the rare-earth-doped double-clad fiber via the multi-mode fiber. In the optical fiber laser, a core diameter of the multi-mode fiber is larger than that of the rare-earth-doped double-clad fiber. Therefore, the ASE with unnecessary wavelengths that has entered the multi-mode fiber without being reflected by the FBG has a low percentage of reuniting with the core of the rare-earth-doped double-clad fiber through reflection. Therefore, a parasitic oscillation is suppressed. Even if a parasitic oscillation occurs, the generated pulses enter the multi-mode fiber at first. Therefore, even the ASE is collected on the excitation light source via a lens, its spot diameter becomes large. Consequently, the excitation light source is unlikely to be damaged.

However, in the method described in Patent Document 3, the suppression of the reflectance is, in actuality, approximately 0.001% at best. Therefore, in a comparatively high-output optical fiber laser that emits tens of watts or more laser beam, there is a possibility that a parasitic oscillation will occur with this slight reflection or Rayleigh scattering in the fiber functioning as seeds, no matter much the reflection is suppressed. Furthermore, as for reflected light from the outside that is produced after the laser emission (reflected light on the surface of the material to be machined), the intensity of the reflected light is attenuated by the isolator. However, it is impossible to completely suppress the reflected light. This leads to a possibility of inducing a parasitic oscillation with the slightly remaining reflected light functioning as seeds.

In the method described in Patent Document 4, a high-gain amplifier is provided on the exit side. Therefore, there is a possibility of inducing a parasitic oscillation because reflected light from the outside enters the high-gain amplifier at the beginning. To address this, the use of low-gain amplifiers in multiple stages instead of a high-gain amplifier can be conceived. However, in this case, the higher the output is, the greater the number of the stages is. This results in a complex configuration, and hence, lowers efficiency.

In the method described in Patent Document 5, light with wavelengths not reflected by the FBG has a low percentage of reuniting with the core of the rare-earth-doped double-clad fiber after reflection off the end face of the multi-mode fiber. However, the light does not unite with the core at all. Therefore, the higher the gain of an optical fiber amplifier becomes, the higher the percentage of reuniting with the core is. This leads to a possibility of a parasitic oscillation. Furthermore, as for reflected light from the outside, light with the same wavelength as the reflected wavelength of the FBG is reflected by the FBG. However, light outside the wavelength passes through the FBG and enters the rare-earth-doped double-clad fiber. Therefore, there is a possibility that a parasitic oscillation is induced by the light which has entered the rare-earth-doped double-clad fiber.

Patent Document 1: Japanese Patent No. 2977053
Patent Document 2: U.S. Pat. No. 5,864,644
Patent Document 3: Japanese Patent Publication, First Publication No. H05-136498
Patent Document 4: Japanese Patent No. 2653936
Patent Document 5: Japanese Patent Publication, First Publication No. H10-56227

SUMMARY OF THE INVENTION

The present invention has been achieved in view of the above circumstances, and has an object to provide an optical fiber laser in which a parasitic oscillation is suppressed and a pulse with high energy is capable of being stably emitted.

To solve the above problems and achieve the object, the present invention adopts the followings.

(1) An optical fiber laser of the present invention is an optical fiber laser including: a master oscillator which is a laser oscillator producing a seed beam; and a power amplifier which is an optical amplifier connected to a subsequent stage of the master oscillator and amplifying and outputting a laser beam emitted from the master oscillator, in which the power amplifier includes: a plurality of excitation light sources; excitation ports each of which is connected to the excitation light sources and which an excitation light emitted from each of the excitation light source enters; a signal port which a laser beam emitted from the master oscillator enters; an optical coupler with an exit port that outputs the excitation light from the excitation ports together with the laser beam from the signal port; and an optical fiber connected to the exit port, in which the optical fiber is a photonic bandgap fiber, and in which the optical fiber has a loss wavelength characteristic in that a photonic bandgap region is narrower than a gain wavelength band in a graph with an axis of abscissa representing wavelength and an axis of ordinate representing loss amount.

(2) It is preferable that the optical fiber include: a core portion made of a solid material doped with a rare-earth element; a first cladding provided around the core portion; and a periodic structure portion in which a multitude of high refractive index portions with a refractive index higher than that of the first cladding are arranged in a periodic structure, the periodic structure portion being provided in a vicinity of the core portion in the first cladding.

(3) It is preferable that the maximum relative index difference of the high refractive index portion be 2% to 3% with respect to the first cladding.

(4) It is preferable that the core portion be higher than the periodic structure portion in electric field distribution of light in the photonic bandgap region and that the periodic structure portion be higher than the core portion in electric field distribution of light outside the photonic bandgap region.

(5) It is preferable that at least germanium be included in the high refractive index portion.

(6) An optical fiber laser of the present invention is an optical fiber laser including: a master oscillator as a laser oscillator for producing a seed beam; and a power amplifier as an optical amplifier that is connected at a subsequent stage of the master oscillator for amplifying and outputting a laser beam emitted from the master oscillator, in which the master oscillator includes: an excitation light source; a WDM coupler that is connected to the excitation light source for combining an excitation light from the excitation light source with a laser beam; an optical fiber connected to the WDM coupler; an output coupler connected to the optical fiber; and an isolator, in which the WDM coupler, the optical fiber, the output coupler, and the isolator are connected in this order in a ring, and in which the optical fiber has a loss wavelength characteristic in that a photonic bandgap region is narrower than a gain wavelength band in a graph with an axis of abscissa representing a wavelength and an axis of ordinate representing a loss amount.

(7) An optical fiber laser of the present invention including: a master oscillator as a laser oscillator for producing a seed beam; and a power amplifier as an optical amplifier that is connected at a subsequent stage of the master oscillator for amplifying and outputting a laser beam emitted from the master oscillator, in which the power amplifier is the power amplifier according to the above (1), and the master oscillator is the master oscillator according to the above (6).

According to the optical fiber laser as set forth in the above (1), it becomes possible to efficiently eliminate ASE with unnecessary wavelengths that are a cause of a parasitic oscillation. Consequently, it is possible to lengthen the time until an occurrence of a parasitic oscillation. Therefore, the optical fiber laser can store more energy than conventional optical fiber lasers. As a result, when pulsed light is amplified, high-gain amplification can be performed, and hence, a pulsed output with high energy that conventional optical fiber lasers have not been capable of outputting is available.

Furthermore, in conditions under which a parasitic oscillation has conventionally occurred, a parasitic oscillation does not occur in the optical fiber laser of the present invention. Therefore, it is possible to suppress damage done to the parts of the fiber laser due to the parasitic oscillation. Furthermore, in an optical part such as a filter or an isolator with low power resistance that is conventionally used, these optical parts are heated to a high temperature because of eliminating unnecessary and locally high intense light. Therefore, it has been required a cooling apparatus, or has brought about deterioration in the characteristics of the part. In the optical fiber laser of the present invention, unnecessary light is eliminated with respect to a wavelength distribution. This prevents unnecessary light becoming highly intense. Therefore, the unnecessary light has little effect on optical parts, facilitating cooling. Therefore, it is possible to provide an optical fiber laser which can be used for a long time stable. In addition, in the optical fiber laser according to the above (6), similar operational advantages are obtained.

Figure 1A:
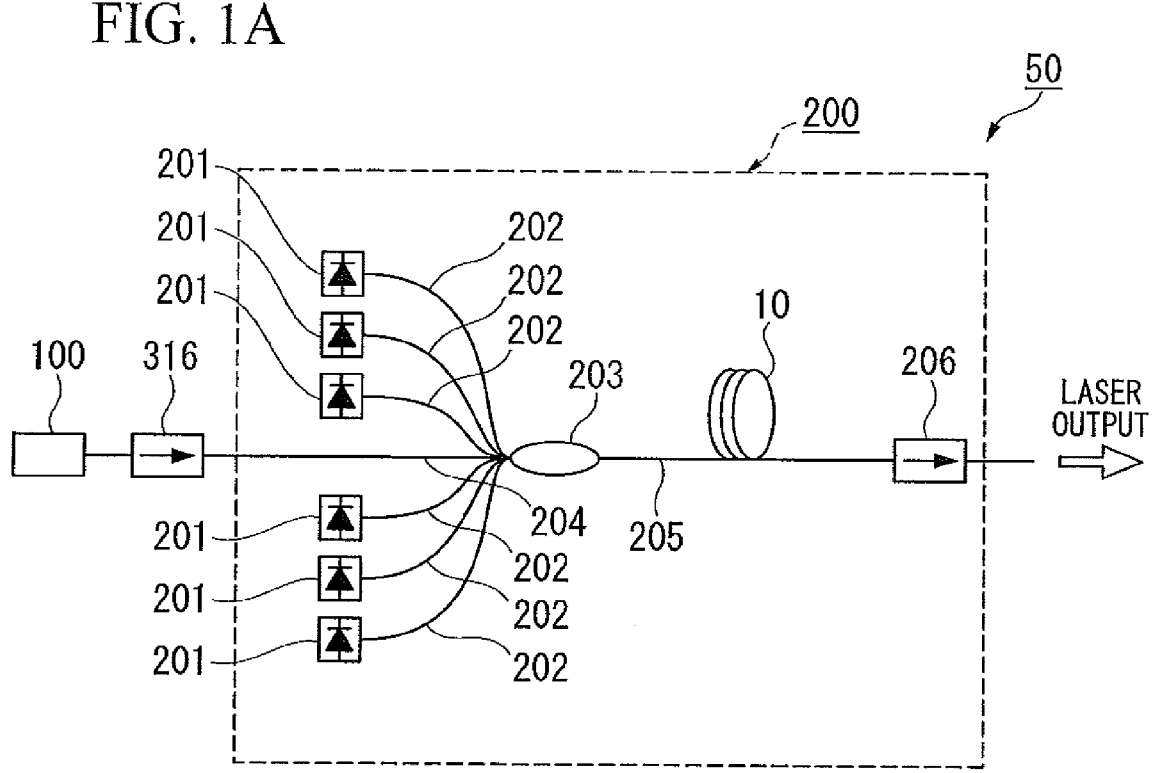
FIG. 1A is a diagram schematically showing an optical fiber laser according to a first embodiment of the present invention.

DESCRIPTION OF THE REFERENCE SYMBOLS 10 (10A, 10B, 10C, 10D, 10E): optical fiber
11, 21, 31, 41, 51: core portion
12, 22, 32, 42, 52: periodic structure portion
13, 23, 33, 43, 53: first cladding
14, 24, 32, 44, 54: high refractive index portion
100: master oscillator (MO)
101: excitation light source
102: WDM coupler
104: isolator
105: output coupler
107: optical switch element
200: power amplifier (PA)
201: excitation light source
202: excitation port
203: optical coupler
205: exit port
206: isolator
316: interstage isolator

DETAILED DESCRIPTION OF THE INVENTION

<First Embodiment>

Hereunder is a detailed description of the present invention with reference to the drawings. However, the present invention is not limited to this. Various modifications can be made without departing from the spirit or scope of the present invention.

Figure 1B:
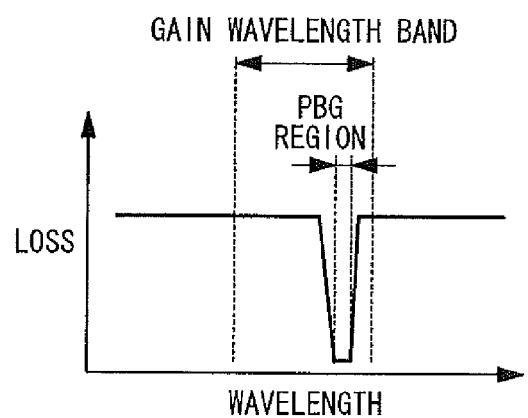
FIG. 1B is a diagram showing a loss wavelength characteristic of an optical fiber used in the optical fiber laser according to the embodiment.

FIG. 1A is a configuration diagram schematically showing an optical fiber laser 50 according to a first embodiment of the present invention. FIG. 1B shows a loss wavelength characteristic of an optical fiber 10 used in the optical fiber laser 50 of the present embodiment.

Figure 14:
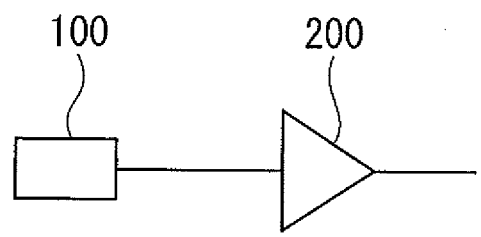
FIG. 14 is a schematic diagram of a representative optical fiber laser with the MOPA system.
Figure 15:
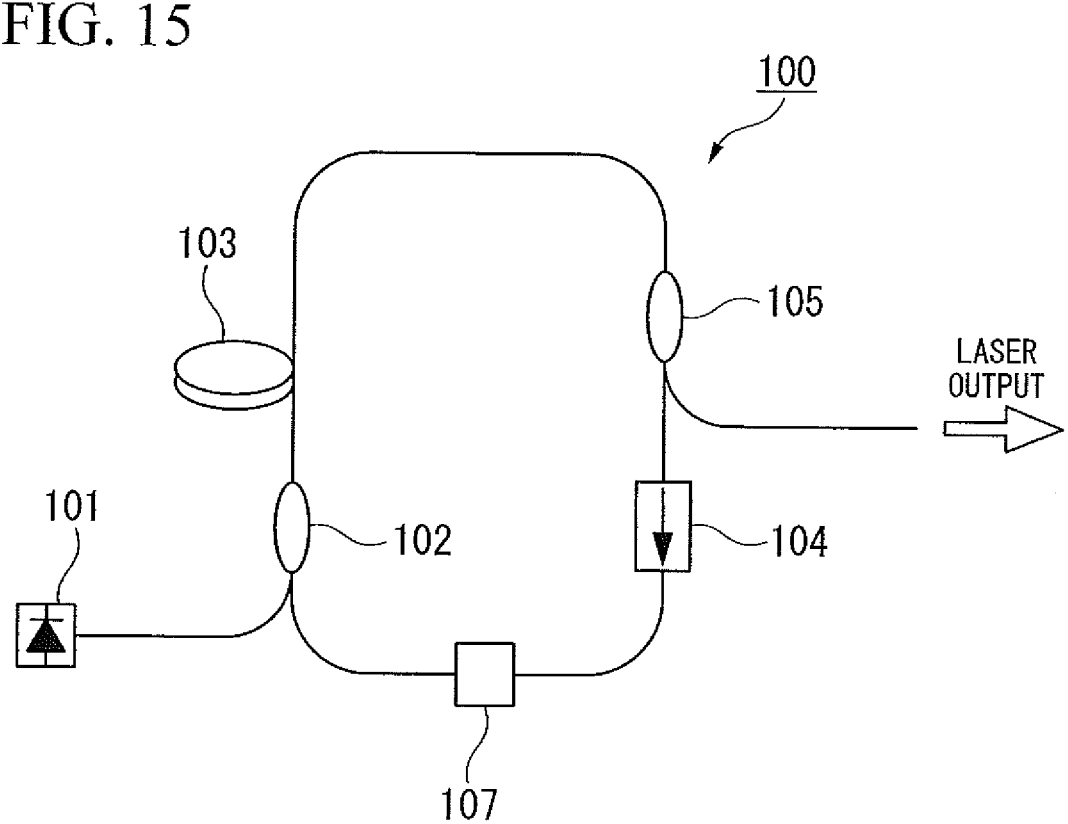
FIG. 15 is a diagram schematically showing a general MO.
Figure 16:
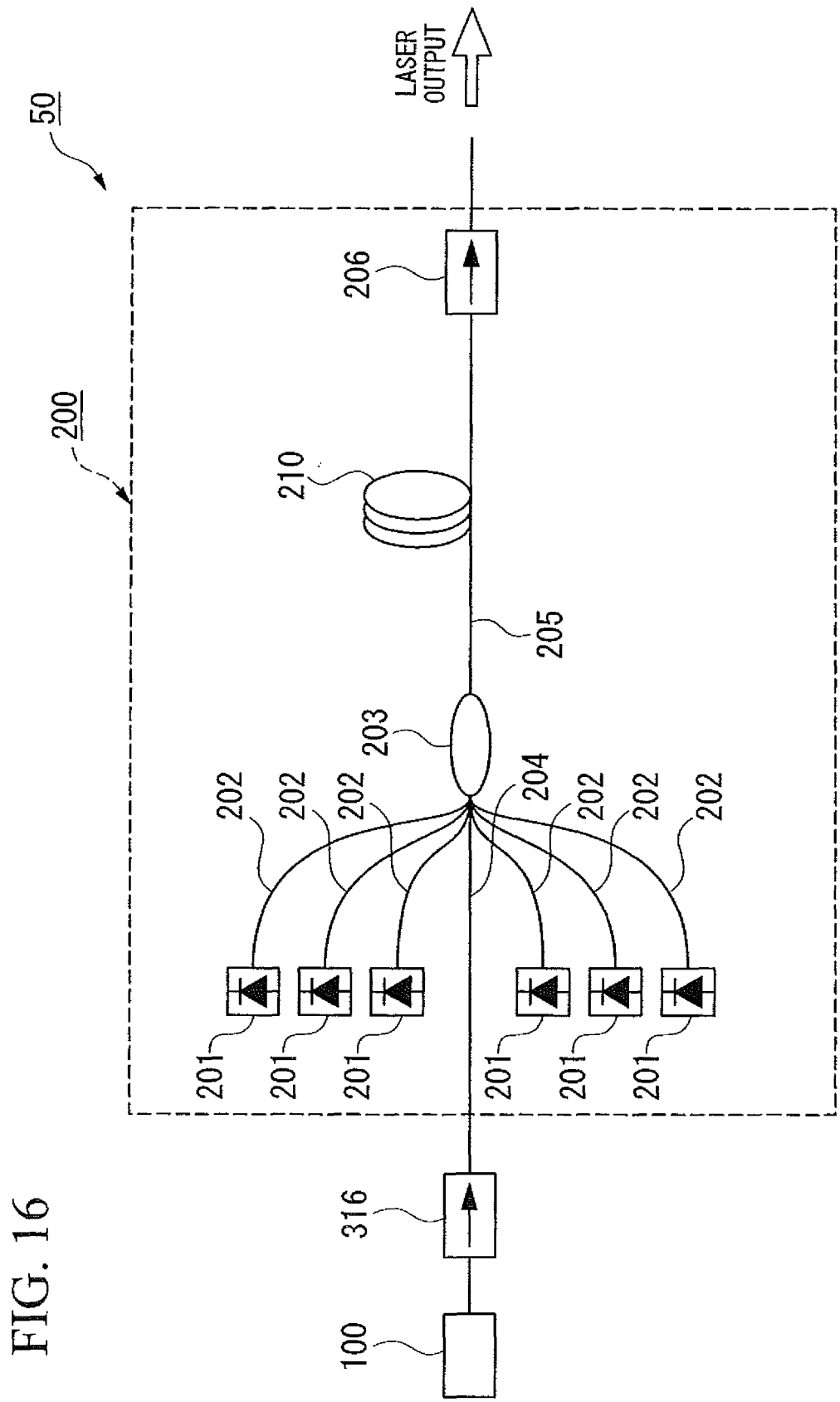
FIG. 16 is a diagram schematically showing a general PA and a general optical fiber laser.

Similarly to the optical fiber laser shown in FIG. 14, the optical fiber laser of the present embodiment is an optical fiber laser 50 with the MOPA system in which a master oscillator (hereinafter, sometimes referred to as MO) 100 of a laser oscillator for producing a seed beam is connected with a power amplifier (hereinafter, sometimes referred to as PA) 200 that amplifies and outputs the laser beam emitted from the MO 100. The power amplifier is at the subsequent stage of the MO. As the MO 100, for example a fiber ring laser 100 shown in FIG. 15 can be used. The output of the MO 100 is connected to the PA 200 via an interstage isolator 316. The PA 200 includes: a plurality of excitation light sources 201; excitation ports 202 each of which is connected to the excitation light sources 201, and each of which an excitation light emitted from each excitation light source 201 enters; a signal port 204 which a laser beam emitted from the master oscillator 100 enters; an optical coupler 203 with an exit port 205 that outputs the excitation lights having entered from the excitation ports 202 together with the laser beam having entered from the signal port 204; and an optical fiber 10 connected to the exit port 205. The laser beam emitted from the MO 100 enters the PA 200 via the signal port 204, and is then incident into the core of the optical fiber 10 via the optical coupler 203. Here, the optical fiber 10 is provided with a core and a cladding that surrounds the core. The core is doped with rare-earth ions. The configuration of the optical fiber 10 will be described in detail later. On the other hand, the excitation lights emitted form the excitation light sources 201 enter a first cladding of the optical fiber 10 via the optical coupler 203. The excitation lights having entered the first cladding of the optical fiber 10 are absorbed into the rare-earth ions doped in the core, thus forming a population inversion. This produces stimulated emission. With the stimulated emission, the laser beam propagating through the core is amplified. The amplified laser beam is output via the isolator 206. That is, the laser beam that has been output from the MO 100 enters the PA 200 via the interstage isolator 316. The laser beam is amplified by the PA 200, and is then output.

Hereunder is a detailed description thereof.

For the optical coupler 203, a conventional, known optical coupler such as disclosed, for example, in Patent Document 2 is used. On one side, the optical coupler 203 has a plurality of excitation ports 202 made of a multi-mode optical fiber, and a signal port 204 made of a single-mode fiber. On the other side, the optical coupler 203 has an exit port 205 that emits excitation lights having entered from the excitation ports 202 together with a laser beam having entered from the signal port 204.

As an excitation light source 201, a laser diode (LD) or the like is favorably used. However, the excitation light source 201 is not limited to this.

The optical fiber 10 is a photonic bandgap fiber, and has a loss characteristic shown in FIG. 1B. In the graph of FIG. 1B, the axis of abscissas represents the wavelength of light, and the axis of ordinate represents the loss amount of light. In the loss wavelength characteristic of the optical fiber 10 according to the present embodiment, the photonic bandgap is present in the gain wavelength band of the optical amplification by the rare-earth ions doped in the core. Furthermore, the wavelength band of the photonic bandgap is narrower than the gain wavelength band. In addition to the relationship between the wavelength bands, the photonic bandgap has its configuration determined as follows so as to include the oscillation wavelength of the optical fiber laser 50. That is, in a wide range of wavelength bands of spontaneous emission that is produced when the rare-earth ions doped in the core portion is excited, the photonic bandgap is formed only in the oscillation wavelength band to be guided. Therefore, light with the oscillation wavelength propagates while confined in the core portion of the optical fiber 10. On the other hand, spontaneous emission in the wavelength band outside the oscillation wavelength is released into the cladding without being confined in the core portion. That is, the spontaneous emission in the wavelength band outside the oscillation wavelength band that functions as seeds of a parasitic oscillation is released into the cladding from the core portion. Therefore, it is possible to suppress a parasitic oscillation.

A parasitic oscillation is likely to occur especially at a wavelength at which the gain of the rare-earth-doped optical fiber is maximum. If the loss of the resonator has a wavelength dependence, a parasitic oscillation occurs in a wavelength region in which the difference between the gain of the rare-earth-doped optical fiber and the loss of the resonator (gain–loss) is maximized. Therefore, when such a wavelength band is set to be outside the photonic bandgap region as shown in FIG. 1B, the effect of suppressing a parasitic oscillation becomes large.

Figure 2A:
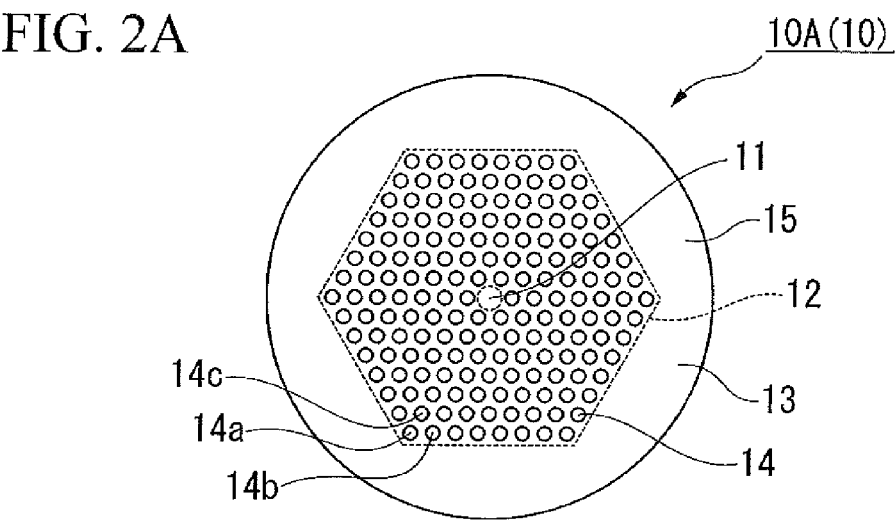
FIG. 2A is a cross-sectional view schematically showing the optical fiber used in the optical fiber laser according to the embodiment.

An optical fiber 10A (10) for use in the optical fiber laser 50 of the present embodiment has a cross-sectional configuration as shown, for example, in FIG. 2A. The optical fiber 10A roughly includes: a core portion 11 made of a solid material doped with a rare-earth element; a first cladding 13 provided around the core portion 11; and a periodic structure portion 12 provided in the vicinity of the core portion 11 of the first cladding 13, in which a multitude of high refractive index portions 14 with a refractive index higher than that of the first cladding 13 are arranged in a periodic structure. Although not shown in the figure, around the outer periphery of the first cladding 13, there may be provided a fluorine-based ultraviolet-curing resin layer in which a relative index difference from pure silica is a negative value (for example, approximately −5%).

Furthermore, the optical fiber 10A has a completely solid configuration with no holes. Therefore, when the optical fiber 10A of the present embodiment is fusion-spliced with another optical fiber, holes will never become flat. Therefore, it is possible to fusion-splice the optical fiber 10A at a low optical loss.

Each of the core portion 11, the periodic structure portion 12, and the first cladding 13 of the optical fiber 10A is made of pure silica glass or silica-based glass formed of pure silica glass doped with a dopant for adjusting a refractive index such as fluorine or germanium oxide. In the optical fiber 10 of the present embodiment, the materials for each portion are not limited to the examples illustrated in the present embodiment.

The core portion 11 is formed of pure silica doped with rare-earth ions. It is preferable that the core portion 11 has a refractive index equivalent to that of pure silica. Types of rare-earth ion to be doped include, for example, ytterbium (Yb), erbium (Er), thulium (Tm), neodymium (Nd), and praseodymium (Pr). These rare-earth ions may be used alone or mixed in a desired ratio.

In the vicinity of the core portion 11 in the first cladding 13, there are arranged a multitude of high refractive regions (high refractive index portions 14) which each have a small circular shaped cross-section and are doped with germanium (Ge) and the like. The high refractive index portions 14 are arranged in a periodic structure in a triangular lattice, to thereby form a periodic structure portion 12. In the present specification, a triangular lattice refers to a configuration in which a first high refractive index portion 14a, a second high refractive index portion 14b adjacent to the first high refractive index portion 14a, and a third high refractive index portion 14c adjacent to both of the first high refractive index portion 14a and the second high refractive index portion 14b form an equilateral triangle.

With the adjustment of the diameter and period of the high refractive index portions 14, the adjustment of the distance between the high refractive index portions 14, and the adjustment of the relative index difference between the high refractive index portion 14 and pure silica glass, it is possible to form a photonic band in a desired wavelength band. For example, the high refractive index portion 14 has a diameter of 3 μm to 5 μm, the distance between the high refractive index portions 14 is 5 μm to 10 μm, the high refractive index portions 14 have a period of 3 layers to 6 layers, and the maximum relative index difference between the high refractive index portion 14 and the first cladding is 2% to 3%.

In the optical fiber 10A of the present embodiment, the region of the first cladding 13 in which the periodic structure portion 12 is arranged occupies more area than the region of the first cladding 15 in which the periodic structure portion 12 is not arranged.

Figure 2B:
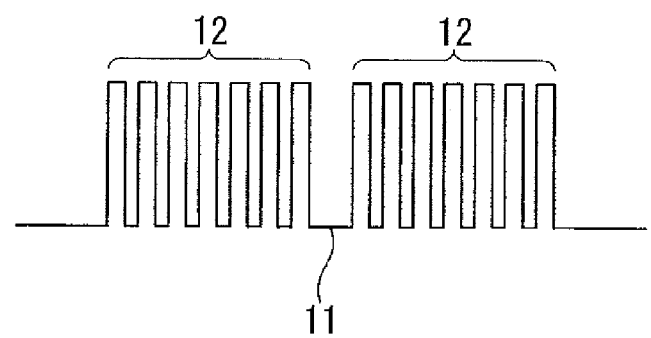
FIG. 2B is a diagram showing a refractive index profile of the optical fiber used in the optical fiber laser according to the embodiment.

Thus, in the optical fiber 10A used in the present embodiment, the core portion 11 with a refractive index equal to that of pure silica is arranged at the center, and the periodic structure portion 12 is arranged therearound. The periodic structure portion 12, which is doped with Ge and the like, has a refractive index higher than that of the core portion 11. Therefore, the refractive index profile of the optical fiber 10A is illustrated as shown in FIG. 2B. As shown in FIG. 2B, the core portion 11 and the first cladding 13 are equivalent in refractive index, and the refractive index of the periodic structure portion 12 (the refractive index of the high refractive index portions 14) is higher than that of the core portion 11 and the first cladding 13.

When light enters the optical fiber 10A, light in the wavelength region of the photonic bandgap is not capable of being guided through the periodic structure portion 12 in which the high refractive index portions 14 are arranged. Therefore, the light in the wavelength region of the photonic bandgap is confined in the lower refractive index region, that is, in the core portion 11. As a result, in the light in the wavelength region of the photonic bandgap, the electric field concentrates in the core portion 11 as shown in the upper portion of FIG. 2C, and is guided through the core portion 11. That is, with respect to light in the wavelength region of the photonic bandgap, the lower refractive region functions as a core portion, and the higher refractive region (the periodic structure portion 12 made of the high refractive index portions 14) functions as a cladding.

On the other hand, light in the wavelength region outside the photonic bandgap can be guided not only through the core portion 11, but also through the periodic structure portion 12. At this time, its electric field distribution is widely different from the electric field distribution of the wavelengths in the photonic bandgap region. As shown in the lower portion of FIG. 2C, most of the electric field is in the periodic structure portion 12. Thus, between the wavelength region of the photonic bandgap and the other wavelength regions, there is a large difference in electric field distribution when light is guided through the fiber. Light in the wavelength region outside that of the photonic bandgap is spread all over the optical fiber 10A from the core portion 11 and is then radiated. Therefore, the spontaneous emission produced by the excitation of the rare-earth ions is released from the core portion 11 to the cladding before it is turned to ASE light.

As described above, in the optical fiber laser 50 of the present embodiment, the optical fiber 10A is used, to thereby make it possible to efficiently eliminate ASE with unnecessary wavelengths that is a cause of a parasitic oscillation, and to lengthen the time until an occurrence of a parasitic oscillation. Therefore, the optical fiber laser 50 can store more energy than conventional optical fiber lasers. Consequently, when pulsed light is amplified, amplification with a high gain can be performed, and hence, a pulsed output with high energy that conventional optical fiber lasers have not been able to output is available. Furthermore, in conditions under which a parasitic oscillation has conventionally occurred, a parasitic oscillation does not occur in the present embodiment. Therefore, it is possible to suppress damage occurring in the parts of the fiber laser. Furthermore, unnecessary light is eliminated with respect to a wavelength distribution. This prevents the unnecessary light from becoming highly intense. Therefore, the unnecessary light has a little effect on the optical parts, facilitating the cooling of the parts constituting the optical fiber laser. Consequently, an optical fiber laser which can be used for a long time stable is obtained.

<Second Embodiment>

Figure 3A:
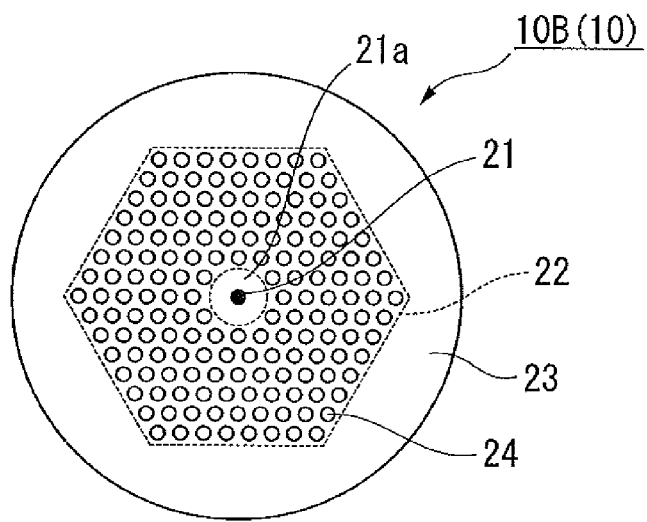
FIG. 3A is a cross-sectional view schematically showing an optical fiber used in an optical fiber laser according to a second embodiment of the present invention.
Figure 3B:
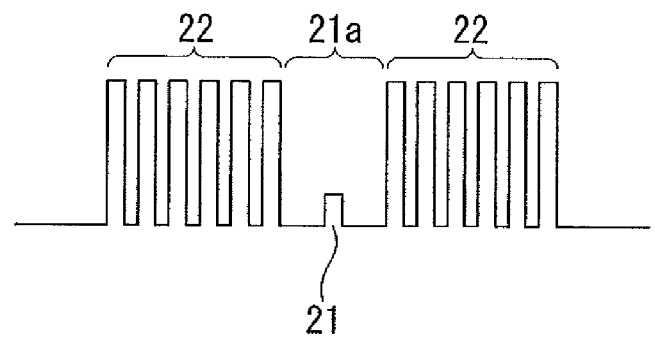
FIG. 3B is a diagram showing a refractive index profile of the optical fiber used in the optical fiber laser according to the embodiment.
Figure 3C:
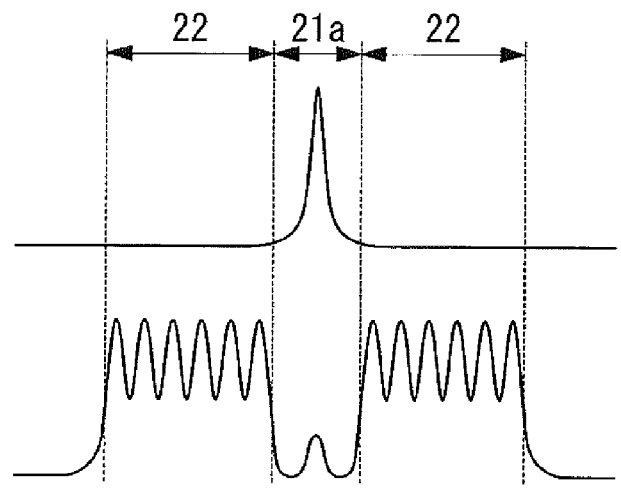
FIG. 3C is a diagram schematically showing the electric field distribution of the optical fiber used in the optical fiber laser according to the embodiment.

FIG. 3A is a cross-sectional view schematically showing an optical fiber 10B (10) mounted in an optical fiber laser according to a second embodiment. FIG. 3B is a diagram showing a refractive index profile of the optical fiber 10B used in the present embodiment. FIG. 3C is a diagram showing an electric field distribution of the optical fiber 10B used in the present embodiment.

The optical fiber laser of the present invention is different from the optical fiber laser of the first embodiment in that the optical fiber 10B is used that has a cross-section shown in FIG. 3A, and also has the refractive index profile shown in FIG. 3B and the electric field distribution shown in FIG. 3C.

In the optical fiber 10B used in the present embodiment, the first layer (the innermost layer) of the high refractive index portion in the periodic structure of the optical fiber 10A of the first embodiment is removed, and a region 21a in which pure silica is arranged is formed. In the region 21a, there is arranged a core portion 21 doped with Yb and additionally with Al, Ge or the like, and hence, with a refractive index higher than that of the pure silica therearound by approximately 0.1% to 0.5%. Therefore, the refractive index profile of the optical fiber 10B of the present embodiment has a portion with a higher refractive index (core portion 21) also in the region 21a.

In the optical fiber 10B of the present embodiment, light with a wavelength in the photonic bandgap region is not capable of being guided through a region with a higher refractive index in which high refractive index portions 24 are arranged (a periodic structure portion 22), similarly to the optical fiber 10A of the first embodiment. Therefore, the light is guided inner than the periodic structure portion 22. In the optical fiber 10B of the present embodiment, the core portion 21 with a refractive index higher than that of pure silica is formed at the center. Therefore, in the light with wavelengths in the photonic bandgap region, the electric field concentrates in the core portion 21 more intensely than that of the optical fiber 10A used in the first embodiment, as shown in the upper portion of FIG. 3C.

On the other hand, as for light with wavelengths outside the photonic bandgap region, most of the electric field is present in the periodic structure portion 22. However, the core portion 21 of the present embodiment has a refractive index higher than that of the pure silica therearound. Consequently, as shown in the lower portion of FIG. 3C, an electric field is slightly present also in the core portion 21 of the optical fiber 10B. Therefore, light with wavelengths outside the photonic bandgap region is capable of being guided through the optical fiber 10B.

The optical fiber 10B of the present embodiment is formed by rotating an optical fiber raw material while the fiber is spun. Therefore, the periodic structure portion 22 is spirally twisted in the length direction of the fiber. Consequently, bending is applied substantially in the length direction of the optical fiber raw material. As a result, in the optical fiber 10B, an optical loss is generated due to macrobends or microbends. In the optical fiber 10B used in the present embodiment, the optical loss is inflicted on light which is guided through the core portion 21 in the wavelength region outside the photonic bandgap, to thereby eliminate the light.

On the other hand, the core portion 21 is at the center of the optical fiber 10B. Therefore, the twist does not affect itself in the shape of the core portion 21. As a result, in light with a wavelength in the photonic bandgap region propagating through the core portion 21, the optical loss due to macrobent or microbent is not generated, and hence, the light is not eliminated from the core portion 11.

The pitch of the spiral may be appropriately adjusted so as to be capable of inflicting loss on light in a desired wavelength region.

As described above, by use of the optical fiber 10B, it is possible to effectively eliminate light with wavelengths outside the photonic bandgap. As a result, in the optical fiber laser using the optical fiber 10B, ASE with unnecessary wavelengths that is a cause of a parasitic oscillation is eliminated, making it possible to lengthen the time until an occurrence of a parasitic oscillation. Therefore, advantages similar to those of the optical fiber laser 50 of the first embodiment are obtained. Especially in the optical fiber 10B of the present embodiment, the core portion 21 has a refractive index higher than that of the optical fiber 10A of the first embodiment. Therefore, the electric field of light with the wavelengths in the photonic bandgap region is present in the core portion 21 more intensely than in the case of the optical fiber 10A of the first embodiment. As a result, in the optical fiber laser of the present embodiment, the laser beam propagating through the core portion 21 can be further amplified. Hence, it is possible to obtain a pulsed output with energy higher than that of the optical fiber laser of the first embodiment.

In the optical fiber 10B used in the present embodiment, a loss is inflicted by macrobends or microbends on light, guided through the core portion 21, with wavelengths outside the photonic bandgap. However, a dopant that can absorb or scatter light with a fluorescence wavelength of Yb may be doped in the periodic structure portion 22, to thereby inflict a loss on light with wavelengths outside the photonic bandgap.

If return losses on the entrance side and the exit side of the optical fiber 10B are larger than the gain obtained in the optical fiber 10B, it is possible to suppress parasitic oscillation. When a light guided through the optical fiber 10B exits from the optical fiber 10B, the light suffers from a loss twice: when it exits from the optical fiber 10B; and when it enters the optical fiber 10B. Therefore, when light exits from or is incident to the optical fiber 10B, it is possible to suppress a parasitic oscillation if the loss received by the light with wavelengths outside the photonic bandgap is more than half of the gain obtained when the light is guided through the optical fiber 10B.

<Third Embodiment>

Figure 4A:
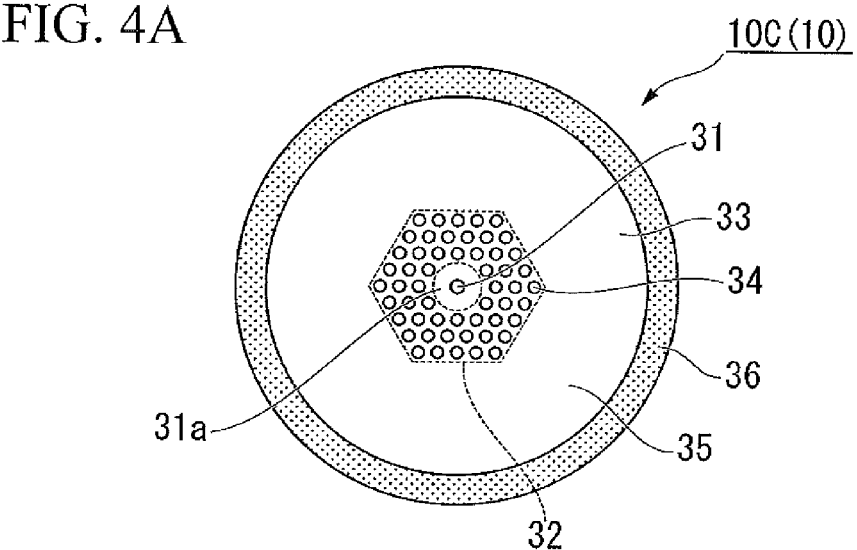
FIG. 4A is a cross-sectional view schematically showing an optical fiber used in an optical fiber laser according to a third embodiment of the present invention.
Figure 4B:
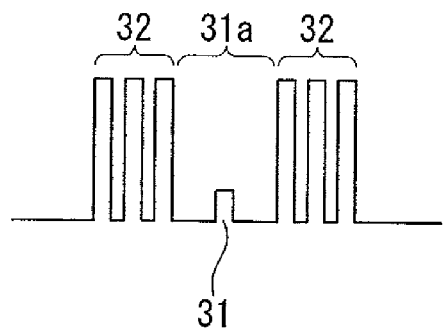
FIG. 4B is a diagram showing a refractive index profile of the optical fiber used in the optical fiber laser according to the embodiment.
Figure 4C:
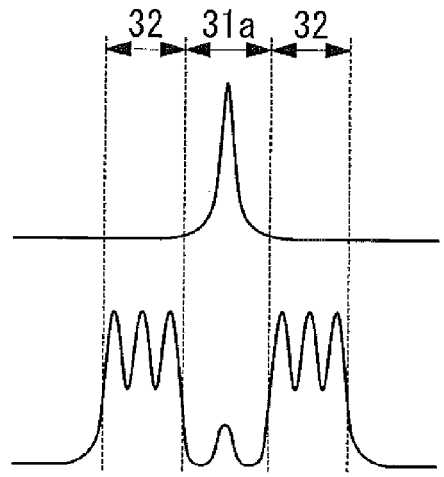
FIG. 4C is a diagram schematically showing an electric field distribution of the optical fiber used in the optical fiber laser according to the embodiment.

FIG. 4A is a cross-sectional view schematically showing an optical fiber 10C (10) mounted in an optical fiber laser according to a third embodiment. FIG. 4B is a diagram showing a refractive index profile of the optical fiber 10C used in the present embodiment. FIG. 4C is a diagram showing an electric field distribution of the optical fiber 10C used in the present embodiment.

The optical fiber laser of the present embodiment is different from the optical fiber laser of the first embodiment in that the optical fiber 10C is used that has a cross-section shown in FIG. 4A, and also has the refractive index profile shown in FIG. 4B and the electric field distribution shown in FIG. 4C.

In the optical fiber 10C used in the present embodiment, the inner first and second layers (the portion in the vicinity of the core) of the periodic structure portion 12 of the first embodiment is removed, and a region 31a made of pure silica is formed. In the region 31a, there is formed a core portion 31 doped with Yb and additionally with Al, Ge or the like, and hence, with a refractive index higher than that of the pure silica therearound by approximately 0.1% to 0.5%. Therefore, the refractive index profile of the optical fiber 10C of the present embodiment has a portion with a higher refractive index also in a core portion 31 of the region 31a.

As for a periodic structure portion 32, the distance between high refractive index portions 34 is narrower by approximately 10% to 20% than that of the periodic structure portion 12 of the first embodiment. The high refractive index portions 34 are packed in the vicinity of the core portion 31. The diameter of the high refractive index portion 34 is larger than that of the first embodiment by approximately 30% to 40%. The relative index difference between the high refractive index portion 34 and pure silica glass is equivalent to the case of the optical fibers in the first embodiment and in the second embodiment. The periodic structure portion 32 of the optical fiber 10 of the present embodiment has layers less than that of the first embodiment, for example, approximately three layers. The first cladding 33 has a diameter similar to that of the first embodiment. Therefore, a region 35 of the first cladding 33 in which the periodic structure portion 32 is not arranged is wider than that of the first embodiment.

Around the outer periphery of the first cladding 33, there is arranged a fluorine-based ultraviolet-curing resin layer 36 in which a relative index difference from pure silica is a negative value (for example, approximately −5%).

The optical fiber 10C used in the present embodiment has a double-clad construction in which light is guided in multimode with a first cladding 33 made of pure silica glass used as a second core and a fluorine-based ultraviolet-curing resin 36 used as a second cladding.

The refractive index profile and the electric field distribution are similar to those of the second embodiment, which are as shown respectively in FIG. 4B and FIG. 4C. That is, in the light in the photonic bandgap region, the electric field concentrates in the core portion 31 more intensely than that of the optical fiber 10A used in the first embodiment, as shown in the upper portion of FIG. 4C. Light with wavelengths outside the photonic bandgap is capable of being guided through the optical fiber 10C because an electric field is present not only in the periodic structure portion 32 but also slightly in the core portion 31 of the optical fiber 10C. In the optical fiber 10C used in the present embodiment, light outside the photonic bandgap region is eliminated by macrobends or microbends, similarly to the optical fiber 10B used in the second embodiment. As for the core portion 31, in light with wavelengths in the photonic bandgap region, an optical loss due to macrobends or microbends is not generated, similarly to the optical fiber 10B of the second embodiment. Hence, the light is not eliminated from the core portion 31.

As described above, by use of the optical fiber 10C, it is possible to effectively eliminate light with wavelengths outside the photonic bandgap region. As a result, in the optical fiber laser using the optical fiber 10C, ASE in unnecessary wavelengths that is a cause of a parasitic oscillation is eliminated, making it possible to lengthen the time until an occurrence of a parasitic oscillation. Therefore, advantages similar to those of the optical fiber laser of the second embodiment are obtained.

<Fourth Embodiment>

Figure 5A:
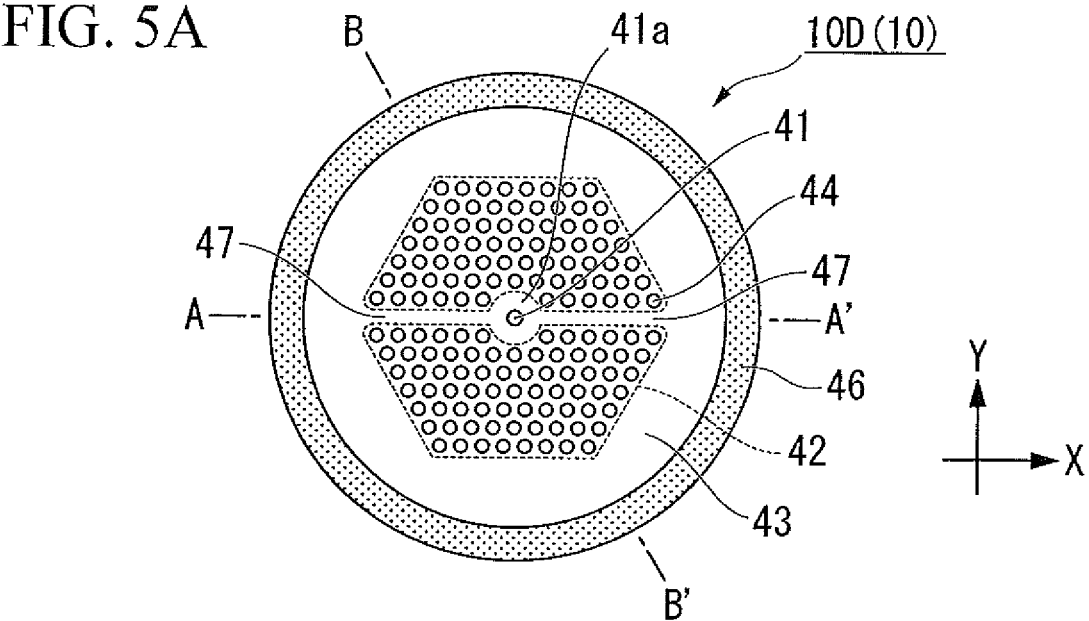
FIG. 5A is a cross-sectional view schematically showing an optical fiber used in an optical fiber laser according to a fourth embodiment of the present invention.
Figure 5B:
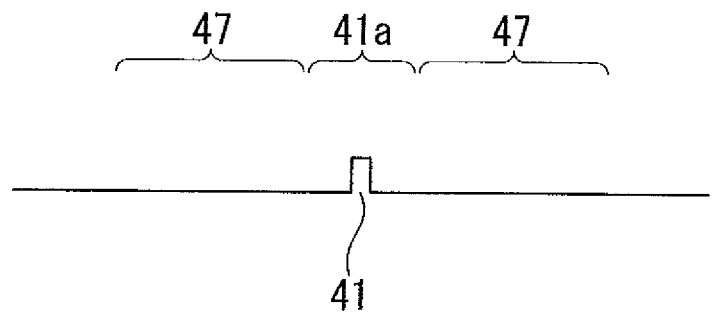
FIG. 5B is a diagram showing a refractive index profile in the A-A' direction of the optical fiber used in the optical fiber laser according to the embodiment.
Figure 5C:
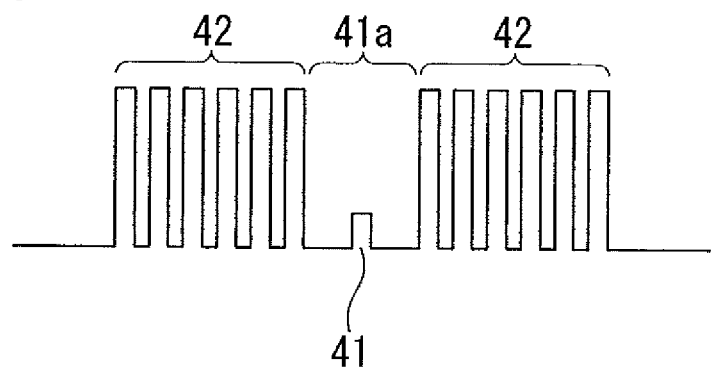
FIG. 5C is a diagram schematically showing a refractive index profile in the B-B' direction of the optical fiber used in the optical fiber laser according to the embodiment.
Figure 5D:
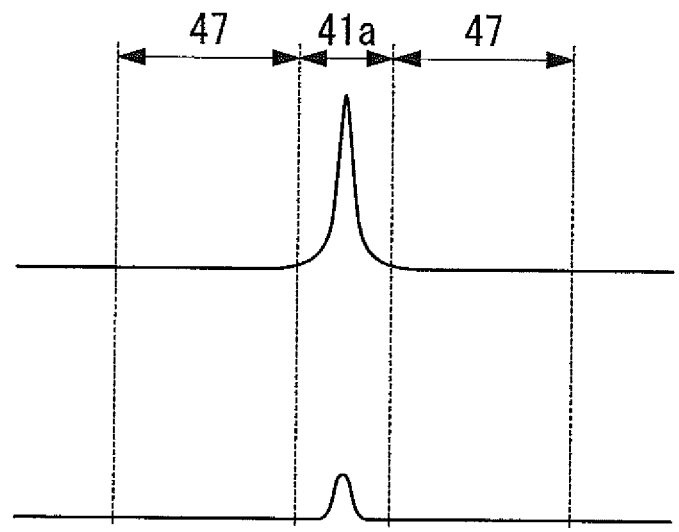
FIG. 5D is a diagram showing the electric field distribution in the A-A' direction of the optical fiber used in the optical fiber laser according to the embodiment.
Figure 5E:
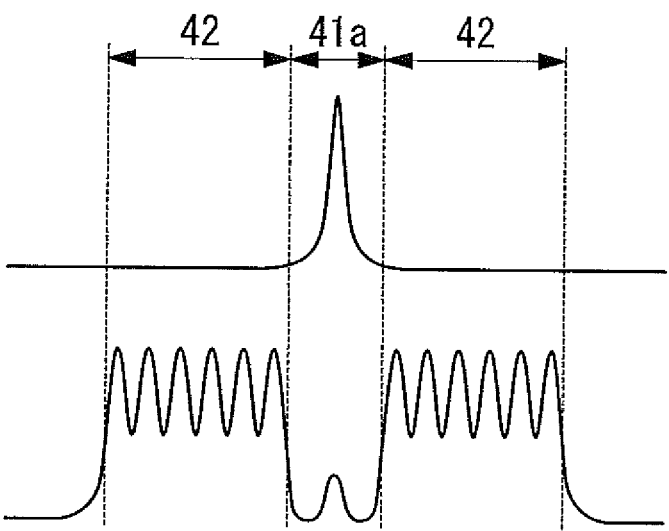
FIG. 5E is a diagram schematically showing an electric field distribution in the B-B' direction of the optical fiber used in the optical fiber laser according to the embodiment.

FIG. 5A is a cross-sectional view schematically showing an optical fiber 10D (10) mounted in an optical fiber laser according to a fourth embodiment. FIG. 5B is a refractive index profile in the A-A' direction of the optical fiber 10D. FIG. 5C is a refractive index profile in the B-B' direction of the optical fiber 10D. FIG. 5D is an electric field distribution in the A-A' direction of the optical fiber 10D. FIG. 5E is an electric field distribution in the B-B' direction of the optical fiber 10D.

The optical fiber laser of the present embodiment is different from the optical fiber laser of the first embodiment in that an optical fiber 10D is used that has a cross-section shown in FIG. 5A, and also has the refractive index profiles shown in FIGS. 5B, 5C and the electric field distributions shown in FIGS. 5D, 5E.

In the optical fiber 10D used in the present embodiment, the relative index difference from the pure silica glass of the core portion 41, the distance between the high refractive index portions 44, the diameter of the high refractive index portion 44, the relative index difference of the high refractive index portion 44, and the like are similar to those of the optical fiber 10C used in the third embodiment. The optical fiber 10D of the present embodiment has more layers of high refractive index portions 44 than the optical fiber 10C of the third embodiment. In addition, along linear regions 47 from the core portion 41 to an outer periphery of the optical fiber, the high refractive index portions 44 are not arranged.

The refractive index profiles and the electric field distributions are as shown in FIGS. 5B to 5E. That is, in light with a wavelength in the photonic bandgap region, the electric field concentrates in the core portion 41 more intensely than the case of the optical fiber 10A used in the first embodiment, as shown in the upper portions of FIG. 5D and FIG. 5E.

Light with the wavelengths outside the photonic bandgap region is capable of being guided through the optical fiber 10D because an electric field is present not only in a periodic structure portion 42 but also slightly in the core portion 41 of the optical fiber 10D as shown in lower portions of FIG. 5D and FIG. 5E.

In the optical fiber 10D used in the present embodiment, light outside the photonic bandgap region that is guided through the core portion 31 is eliminated due to macrobends or microbends, similarly to the optical fiber 10B used in the second embodiment. As for the core portion 41, in light with wavelengths in the photonic bandgap region, an optical loss due to macrobends or microbends is not generated similarly to the optical fiber 10B of the second embodiment. Hence, the light is not eliminated from the core portion 41.

Especially, in the optical fiber 10D used in the present embodiment, more layers of the high refractive index portions 44 are arranged than those in the optical fiber 10C used in the third embodiment. Therefore, a greater amount of light outside the photonic bandgap region is present in the periodic structure portion 42. This can further enhance a suppression effect on parasitic oscillation. In addition, even if a confinement effect on light by the photonic bandgap becomes stronger with an increased number of layers of the high refractive index portions 44, high-order-mode light is radiated through the regions 47 in which the high refractive index portions 44 are not arranged. This allows a stable operation in basic mode.

Therefore, the optical fiber laser using the optical fiber 10D can suppress the occurrence of a parasitic oscillation more effectively than the optical fiber laser of the third embodiment, allowing a stable operation in basic mode.

<Fifth Embodiment>

Figure 6A:
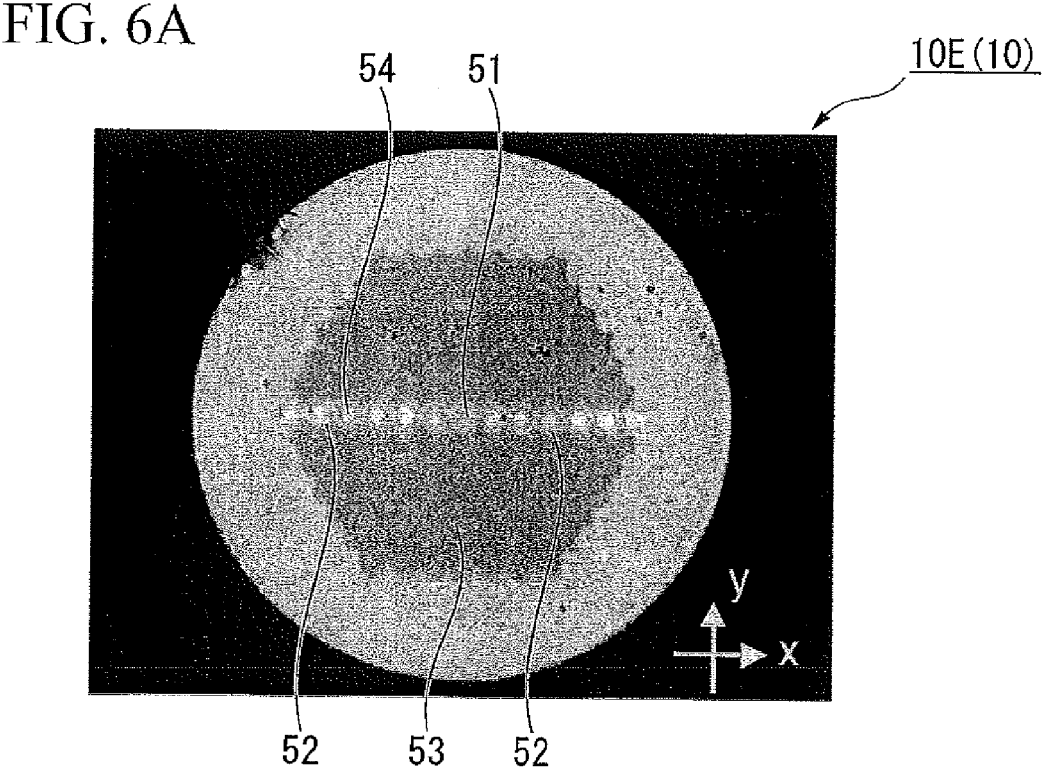
FIG. 6A is an electron micrograph of a cross-section of an optical fiber used in an optical fiber laser according to a fifth embodiment of the present invention.
Figure 6B:
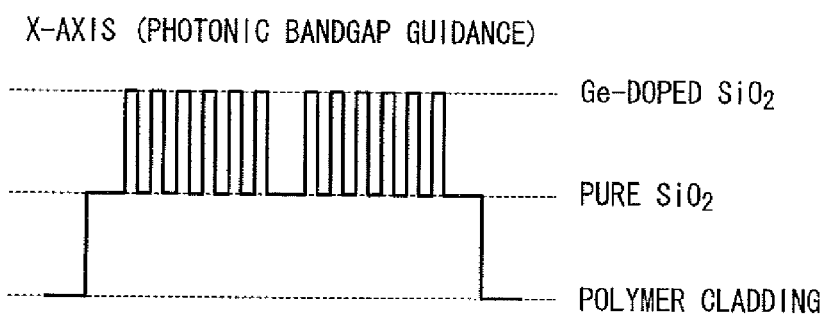
FIG. 6B is a diagram showing a refractive index profiles of the optical fiber used in the optical fiber laser according to the embodiment.
Figure 6B:
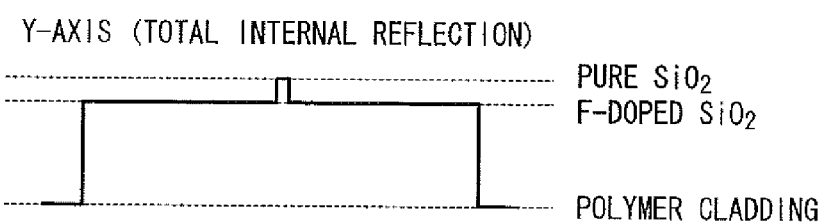
Figure 6C:
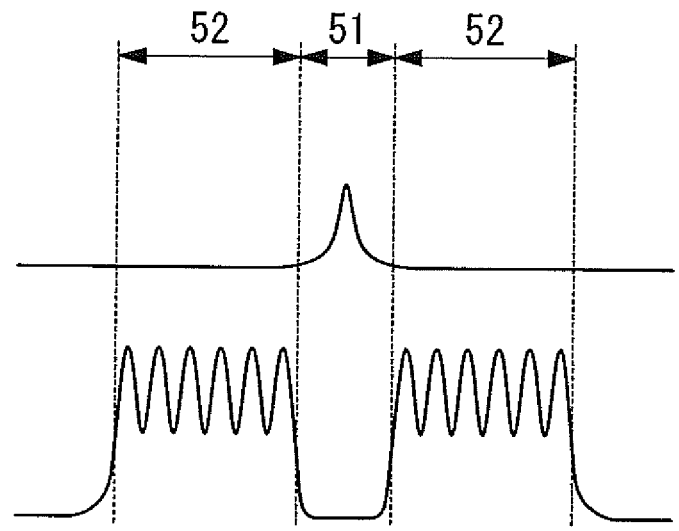
FIG. 6C is a diagram schematically showing the electric field distribution in the X-axis direction of the optical fiber used in the optical fiber laser according to the embodiment.
Figure 6D:
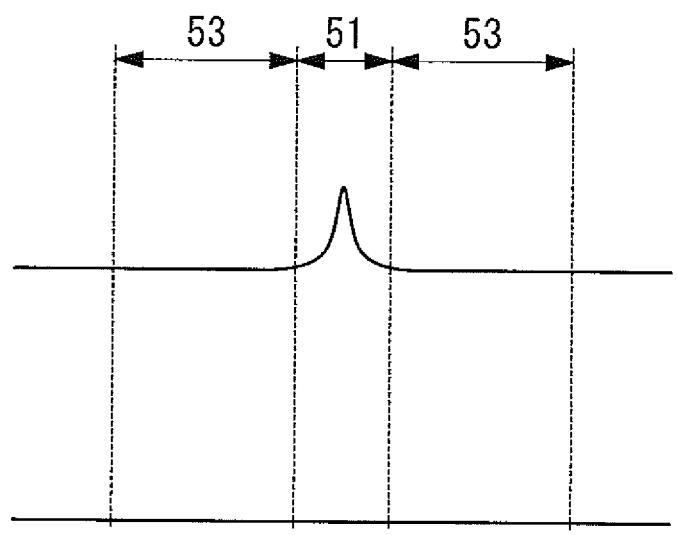
FIG. 6D is a diagram schematically showing the electric field distribution in the Y-axis direction of the optical fiber used in the optical fiber laser according to the embodiment.

FIG. 6A is an electron micrograph of a cross-section of an optical fiber 10E (10) mounted in an optical fiber laser according to a fifth embodiment. FIG. 6B is a diagram showing refractive index profiles of the optical fiber 10E. FIG. 6C is a diagram showing an electric field distribution in the X-axis direction of the optical fiber 10E. FIG. 6D is a diagram showing an electric field distribution in the Y-axis direction of the optical fiber 10E.

The optical fiber laser of the present embodiment is different from the optical fiber laser of the first embodiment in that the optical fiber 10E that has a cross-section shown in FIG. 6A, and that has the refractive index profiles shown in FIG. 6B and the electric field distributions shown in FIGS. 6C, 6D is used.

In the optical fiber 10E used in the present embodiment, the high refractive index portions 64 are arranged only in a single line from a core portion 51 to an outer periphery of the optical fiber. The high refractive index portion 54 is similar to that of the optical fiber 10A used in the first embodiment. Therefore, the optical fiber 10E has refractive index profiles as shown in FIG. 6B. The upper portion of FIG. 6B is a refractive index profile in the X-axis direction shown in FIG. 6A. The lower portion of FIG. 6B is a refractive index profile in the Y-axis direction shown in FIG. 6A.

When light enters the optical fiber 10E, light in the wavelength region of the photonic bandgap is not capable of being guided through the high refractive index portion due to a photonic bandgap formed by pure silica arranged in the X-axis direction and by a periodic structure made of Ge-doped high refractive index portions. Therefore, the light is confined in a core region 51. As for the Y-axis direction, the light is confined in the core region 51 due to a refractive index difference between pure silica and a fluorine- (F-) doped low refractive index portion, to thereby be guided the optical fiber 10E.

On the other hand, light outside the wavelength region of the photonic bandgap can be confined in the core region 51 in the Y-axis direction due to a refractive index difference between pure silica and a F-doped low refractive index portion, similarly to light in the wavelength region of the photonic bandgap. However, in the X-axis direction, the light is guided with most of the electric field distribution not being in the core region 51 but in the high refractive index portion due to the periodic structure.

As described above, by use of the optical fiber 10E, it is possible to effectively eliminate light with wavelengths outside the photonic bandgap. As a result, in the optical fiber laser using the optical fiber 10E, ASE in unnecessary wavelengths that is a cause of parasitic oscillation is eliminated, making it possible to lengthen the time until an occurrence of a parasitic oscillation long. Therefore, advantages similar to those of the optical fiber laser 50 of the aforementioned first embodiment are obtained.

Furthermore, in the optical fiber 10E, there is a significant difference in refractive index structure between in the X-axis direction and in the Y-axis direction. This provides the core with birefringence. With the birefringence, light guided through the core has different refractive indices due to its polarized components, and hence, shows different optical characteristics. Especially, a difference arises in the loss characteristic that is generated when the optical fiber is bent. A loss due to bending is more likely to be generated in the polarized component in the X-axis direction than in the polarized component in the Y-axis direction. Therefore, the optical fiber is bent around a diameter to produce a bend loss only in the Y-axis direction according to the oscillation wavelength of the laser, to thereby make it possible to selectively amplify and output the polarized component in the X-axis direction. That is, only an application of bending on the optical fiber makes it possible to output a laser beam with a single polarization wave without decreasing efficiency.

In addition, as another embodiment, it is also possible to offer a loss in the gain wavelength band, similarly to in the present invention, in a rare-earth-doped optical fiber which is constructed as follows. A rare-earth-doped optical fiber provided with the FBG in the core portion all over its length. A rare-earth-doped optical fiber is wound around a predetermined diameter, to thereby offer a loss to a long wavelength side of the signal wavelength. Alternatively, a cutoff wavelength of the rare-earth-doped optical fiber is provided on a slightly short wavelength side of the signal wavelength, and bending is applied to the rare-earth-doped optical fiber, to thereby offer a loss to the short wavelength side of the signal wavelength.

<Sixth Embodiment>

Figure 7:
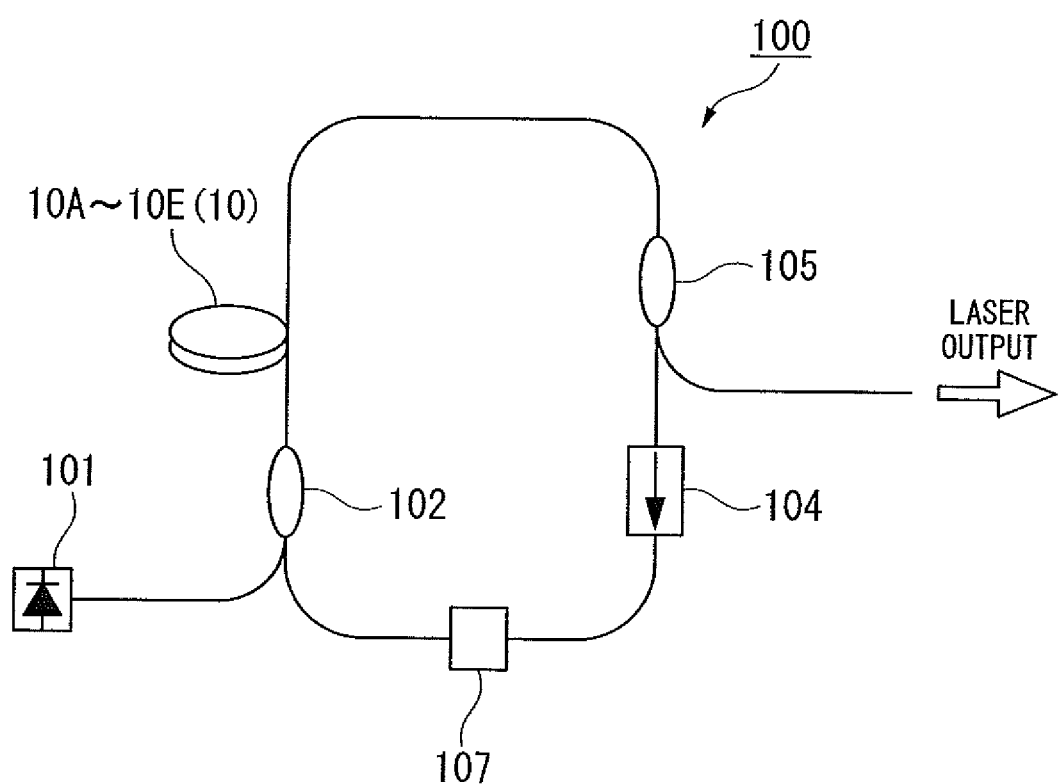
FIG. 7 is a diagram showing an optical fiber laser according to a sixth embodiment of the present invention.

FIG. 7 is a diagram schematically showing an optical fiber laser 100 according to a sixth embodiment.

In the present embodiment, each of the optical fibers 10A to 10E used respectively in the aforementioned first to fifth embodiments is applicable to an optical fiber of an MO.

That is, the MO is roughly made of: a WDM coupler 102 that is connected to an excitation light source 101 and that combines an excitation light from the excitation light source 101 with a laser beam; an optical fiber 10; an output coupler; and an isolator 104. These constituent elements are connected in this order in a ring. In the MO, the optical fiber 10 is any of the aforementioned photonic bandgap fibers 10A to 10E.

With an application of any of the above-mentioned optical fibers 10A to 10E to the MO, it is possible to suppress a parasitic oscillation, and to obtain an MO with which a high output is available, similarly to the case where the application is made to the PA.

The application of the optical fiber 10 used in any of the aforementioned first to fifth embodiments is not limited to only one of the PA and the MO, and is both of the PA and the MO can be used.

With the application to both PA and MO, it is possible to suppress parasitic oscillation more effectively, and to obtain an optical fiber laser with a higher output.

EXAMPLES

Example 1

An optical fiber laser was constructed as shown in FIG. 1A.

Figure 2C:
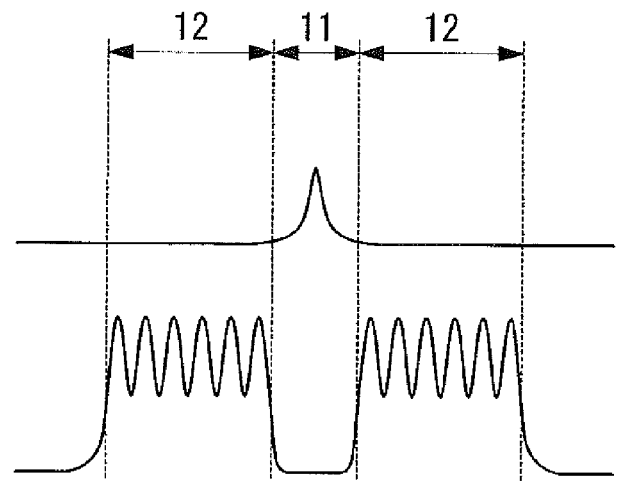
FIG. 2C is a diagram schematically showing the electrical field distribution of the optical fiber used in the optical fiber laser according to the embodiment.

First, as a photonic bandgap fiber, an optical fiber was fabricated that had the cross-sectional configuration as shown in FIG. 2A and the characteristics shown in FIGS. 2B, 2C. The core portion was doped with Yb ions. The core portion was fabricated so that the wavelength region in which a parasitic oscillation is most likely to occur, that is, the vicinity of 1030 nm to 1050 nm, which is a maximum gain wavelength region of the optical fiber doped with Yb ions, was excluded from the bandgap region, and that 1064 nm, which is a signal wavelength, was in the bandgap region. To be more specific, pure silica glass, which was fabricated into a core portion with a relative index difference $\Delta c$ of 0% from pure silica glass and with a diameter d of 7.0 μm, was doped with Yb ions. The core portion was coated with a first cladding made of pure silica glass with a diameter of 125 μm. Around a core portion of the first cladding, there were fabricated a plurality of high refractive index portions made of pure silica glass doped with germanium. The high refractive index portions were arranged in triangular lattices in a manner spaced 7.0 μm away from each other, to thereby form a periodic structure portion made of seven layers of high refractive index portions. Each of the high refractive index portions had a maximum relative index difference Δh of 2.8% from pure silica glass, and a diameter dh of 3.5 μm. The fabricated optical fiber had a core absorption amount of 1200 dB/m at a wavelength of 976 nm.

As for an optical coupler, one having a rare-earth-doped double-clad fiber with a core diameter of 7 μm and a cladding diameter of 125 μm as an exit port was used so as to make a connection loss with a Yb-doped double-clad fiber small. As an excitation port, six multi-mode fibers with a core diameter of 105 μm and an NA of 0.15 were used. As a signal port, a single-mode fiber with a core diameter of 7 μm and an NA of 0.14 was used. As excitation light sources, six semiconductor lasers with an oscillation wavelength of 915 nm and a maximum output of 5 W were used.

In the optical fiber laser, the excitation light sources were driven without a signal from the master oscillator to emit excitation lights, to thereby put the rare-earth-doped double-clad fiber in a state of being excited with an excitation power of 30 W. After that, the time was measured from the injection of the excitation lights to the occurrence of a parasitic oscillation. The result is shown in FIG. 8.

Figure 8:
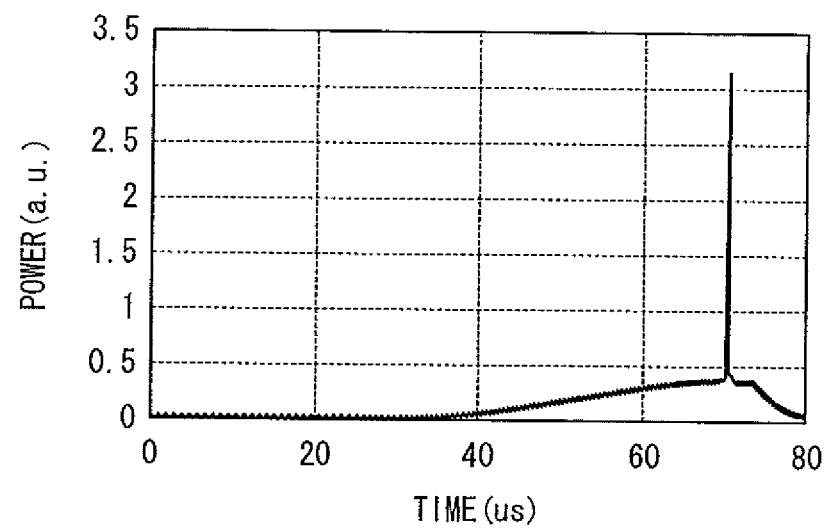
FIG. 8 is a diagram in which an optical fiber laser of Example 1 is used to observe the time from the entry of an excitation light to the occurrence of a parasitic oscillation.

As shown in FIG. 8, in the optical fiber laser of Example 1 using the photonic bandgap fiber shown in FIGS. 2A to 2C, a parasitic oscillation did not occur even with an excitation of approximately 30 μs. Furthermore, with the continuation of excitation for a long time, a parasitic oscillation was observed at approximately 70 μs.

Example 2

An optical fiber laser was fabricated similarly to Example 1, the exception being that the photonic bandgap fiber (hereinafter, sometimes referred to as PBGF) shown in FIGS. 3A to 3C was used instead of the PBGF used in Example 1. In the PBGF of the present example, the first layer (the innermost first layer) of the periodic structure of the PBGF of Example 1 was removed, and pure silica was used instead. At the center, pure silica glass was doped with ytterbium oxide to be functioned as an amplifying medium. Furthermore, the center was doped with aluminum oxide to form a core portion with a relative index difference of 0.3% from pure silica and with a diameter of 6 μm. The high refractive index portions had a relative index difference of 2.6% from pure silica glass. Each of the high refractive index portions had a diameter of 4.8 μm, and the distance therebetween was 6 μm. The first cladding was configured to have a diameter of 125 μm. A layer of fluorine-based ultraviolet-curing resin with a relative index difference of −0.5% from pure silica glass was arranged therearound. The PBGF used in the present example was fabricated with a twist of one turn in 5 mm.

The PBGF used in the present example had a double clad construction in which light is guided in multimode with the first cladding made of pure silica as a second core, and a fluorine-based ultraviolet-curing resin layer as a second cladding. The core absorption amount was 1200 dB/m at a wavelength of 976 nm.

In the optical fiber laser, the time from the injection of excitation lights to the occurrence of a parasitic oscillation was measured, similarly to Example 1. The result is shown in FIG. 9.

Figure 9:
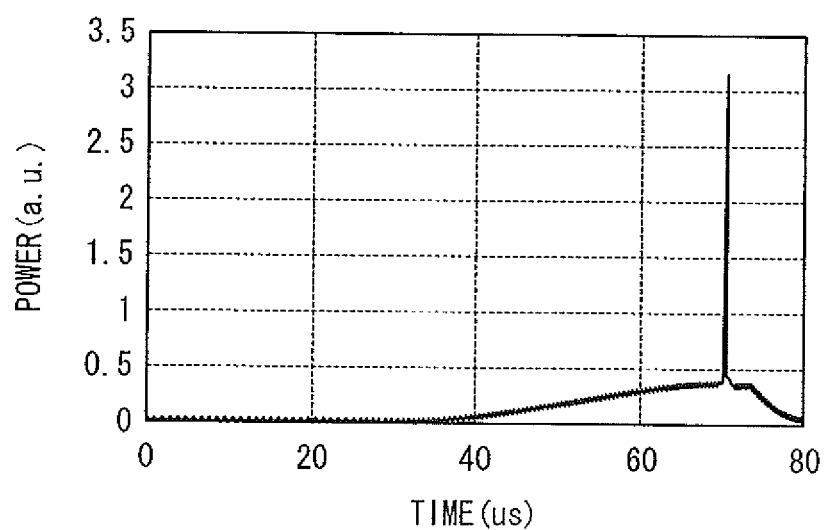
FIG. 9 is a diagram in which an optical fiber laser of Example 2 is used to observe the time from the entry of an excitation light to the occurrence of a parasitic oscillation.

As shown in FIG. 9, in the optical fiber laser of Example 2 using the PBGF shown in FIGS. 3A to 3C, a parasitic oscillation did not occur even with an excitation of approximately 30 μs. Furthermore, with the continuation of excitation for a long time, a parasitic oscillation was observed at approximately 70 μs.

Comparative Example

Instead of the PBGF used in Example 1, a rare-earth-doped optical fiber with a conventional double clad construction was used. The optical fiber had a core doped with Yb ions, a core diameter of 6 μm, a first cladding diameter of 125 μm, and a core absorption amount of 1200 dB/m at a wavelength of 976 nm. In the optical fiber laser, the time from the injection of excitation lights to the occurrence of parasitic oscillation was measured, similarly to in Example 1. The result is shown in FIG. 10.

Figure 10:
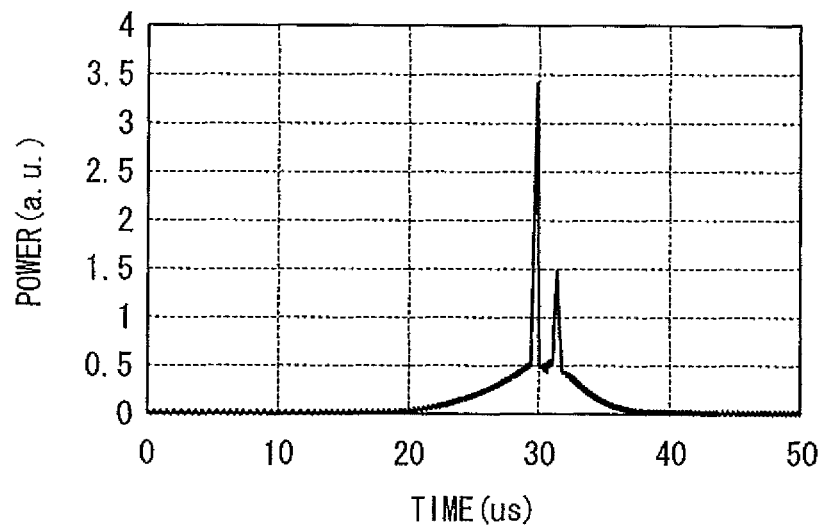
FIG. 10 is a diagram in which an optical fiber laser of Comparative Example is used to observe the time from the entry of an excitation light to the occurrence of a parasitic oscillation.

As shown in FIG. 10, in the optical fiber laser using the conventional optical fiber, a parasitic oscillation was observed at approximately 30 μs.

As described above, in the optical fiber laser of the present invention, it was confirmed that the use of the above PBGF 10 makes the time to a parasitic oscillation twice as long or longer than when compared with the conventional optical fiber laser shown in Comparative Example. As a result, the gain of the rare-earth-doped optical fiber immediately before amplifying pulses is larger than that of the conventional fiber laser. Therefore, it is possible to output pulses with higher energy than the conventional fiber laser.

Next, by use of the optical fiber laser of Example 1 fabricated as above and the optical fiber laser of Comparative example, pulses with a pulse width of 50 ns and a peak power of 60 W (a pulse energy of 0.003 mJ) were generated from the respective MOs, which were input to the respective optical fiber lasers (PAs). Then, maximum pulse energy that was output from each PA was measured.

In the optical fiber laser of Comparative Example, a parasitic oscillation occurs at a pulse interval of approximately 30 μs. Therefore, the interval of the pulses that enter from the MO were regarded as 30 μs. The result is shown in Table 1.

TABLE 1

|  | Example 1 | Comparative Example |
| --- | --- | --- |
| Pulse width | 50 ns | 50 ns |
| Peak power (kW) | 8 | 3 |
| Pulse energy (mJ) | 0.4 | 0.15 |

As shown in Table 1, in the optical fiber laser of Comparative Example, the pulses that were output from the PA had a pulse width of 50 ns and a peak power of 3 kW (a pulse energy of 0.15 mJ). In the optical fiber laser of Example 1, the pulses had a pulse width of 50 ns and a peak power of 8 kW (a pulse energy of 0.4 mJ). Therefore, according to the optical fiber laser of the present invention, by use of the aforementioned PBGF, it is possible to obtain a power output with high energy that conventional optical fiber lasers have not been capable of achieving.

Comparative Example 2

Next, in fabricating the optical fiber laser of Example 2, a PBGF fabricated without applying twists was used to fabricate an optical fiber laser similarly to in Example 2. This was used as an optical fiber laser of Comparative Example 2.

Similarly to Example 2, the time from the injection of the excitation lights to the occurrence of parasitic oscillation was measured. As a result, a parasitic oscillation was observed at approximately 40 μs.

This was because light in the vicinity of 1040 nm guided through the periodic structure was not eliminated, and hence, the component of the light slightly distributed in the core was amplified while being guided through the PBGF of Comparative Example 2. In addition, this was because the gain obtained while the light was guided was larger than the loss of the light from the exit from the PBGF to the re-entry into the PBGF after reflection off the isolator or the like.

A parasitic oscillation occurs at the time when the gain obtained in the PBGF becomes larger than the return losses on the entrance side and the exit side of the PBGF. That is, if the return losses on the entrance side and the exit side of the PBGF are larger than the loss obtained in the PBGF, it is possible to suppress a parasitic oscillation. The return losses on the entrance side and the exit side of the PBGF are different depending on the circuit configuration of the optical fiber amplifier. In some cases, the return loss may be substantially zero. On the other hand, when light enters another optical fiber from the PBGF, light with wavelengths outside the photonic bandgap region receives a great loss because most of its electric field is distributed in the periodic structure.

Light guided through the PBGF receives a loss twice: when it exits the PBGF; and when it enters the PBGF. Therefore, if, when light exits from or enters the PBGF, the loss of the light with wavelengths outside the photonic bandgap region is more than half the gain when it is guided through the PBGF, it is possible to suppress a parasitic oscillation. When the connection losses on the entrance side and the exit side were measured in the PBGF of Comparative Example 2, both were approximately 15 dB. Therefore, it can be conceived that, if the connection losses on the entrance side and the exit side of the PBGF are made to be greater than 15 dB, it is possible to suppress parasitic oscillation.

Example 3

The PBGF of Comparative Example 2 was modified to have an increased number only of layers of the periodic structure so as to allow more components to be guided through the periodic structure, to thereby fabricate a PBGF capable of securing a connection loss of approximately 25 dB on the entrance side and the exit side. The PBGF had a core portion with a diameter of 6 μm, a first cladding with a diameter of 125 μm, and a core absorption amount of 1200 dB/m at a wavelength of 976 nm. The PBGF was used to construct an optical fiber laser similarly to in Example 1. This was used as the optical fiber laser of Example 3. In the optical fiber laser, the time from the injection of the excitation lights to the occurrence of a parasitic oscillation was measured similarly to in Example 1.

As a result, a parasitic oscillation was observed at approximately 60 μs.

Example 4

Figure 11:
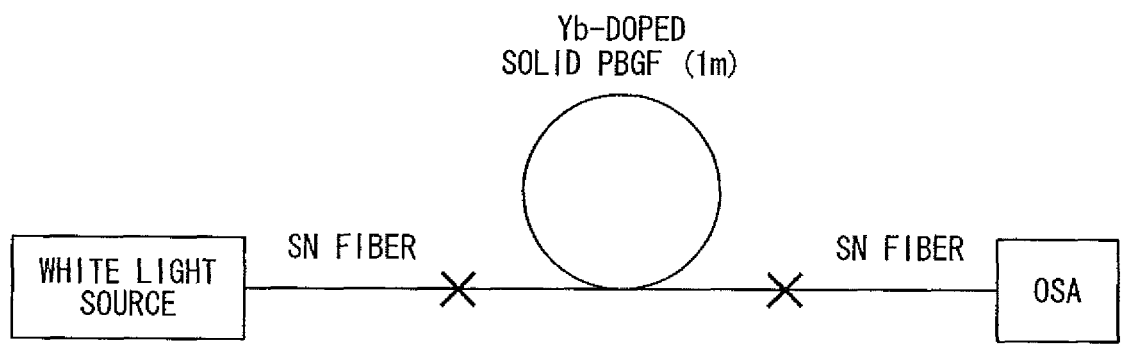
FIG. 11 is a diagram schematically showing an apparatus used when a transmission spectrum of an optical fiber used in Example 4 is measured.

First, the PBGF shown in FIG. 6A was fabricated. The core portion is similar to that of Example 1. Each of the high refractive index portions had a diameter of 3.7 μm, and a relative index difference of 2.8% from pure silica glass. The distance therebetween was 7.3 μm. Next, as shown in FIG. 11, the PBGFs were taken out 1 m. Each of the PBGFs was wound one turn so as to make the diameter 100 mm, 80 mm, or 60 mm respectively. After that, a white light source was irradiated onto an end face of each PBGF to excite the core portion. Then, transmission spectra were measured. The results are shown in FIG. 12.

Figure 12:
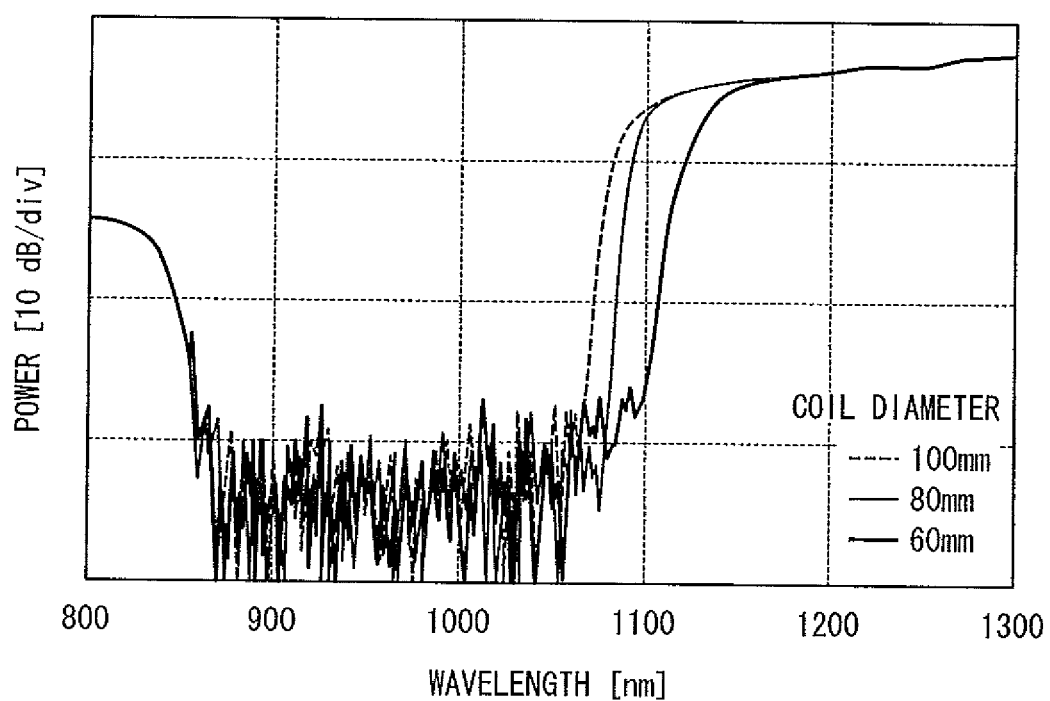
FIG. 12 is a diagram showing the transmission spectrum of the optical fiber used in Example 4.

As shown in FIG. 12, light with wavelengths of approximately 1100 nm or lower was shut out, and light with wavelengths of approximately 1100 nm or higher was transmitted. Therefore, it has been confirmed that the PBGF used in the present example is capable of eliminating ASE light with wavelengths of 1000 to 1100 nm that is guided through the core portion due to the filtering effect by the photonic bandgap, and is also capable of stably oscillating light with wavelengths of approximately 1100 nm or higher.

Furthermore, the smaller the diameter around which the optical fiber was wound, the further on the long wavelength side the graph obtained shifted. Therefore, with a change in the diameter when the optical fiber is wound, it was possible to easily control a gain profile of an optical fiber for doping and amplifying rare-earth ions. Even if the diameter around which the optical fiber was wound was changed, the filtering of the spontaneously emitted light at around 850 nm produced by the excitation of yttrium was not influenced. That is, it has become possible to control a gain profile of an optical fiber for doping and amplifying rare-earth ions while the elimination effect on ASE light is maintained.

Figure 13A:
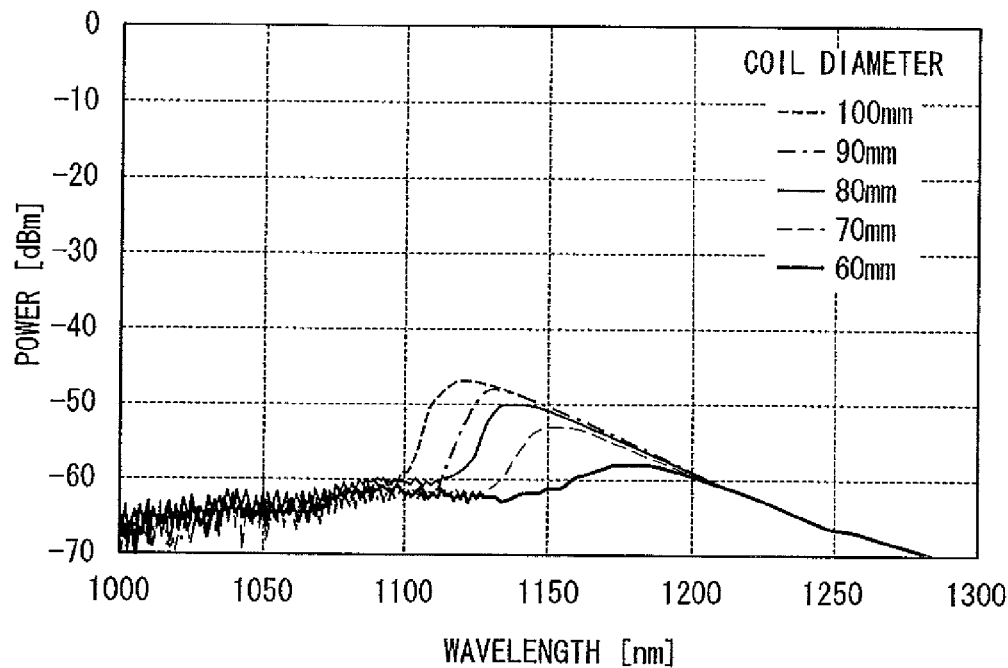
FIG. 13A is a diagram when an ASE spectrum of the optical fiber used in Example 4 is measured.
Figure 13B:
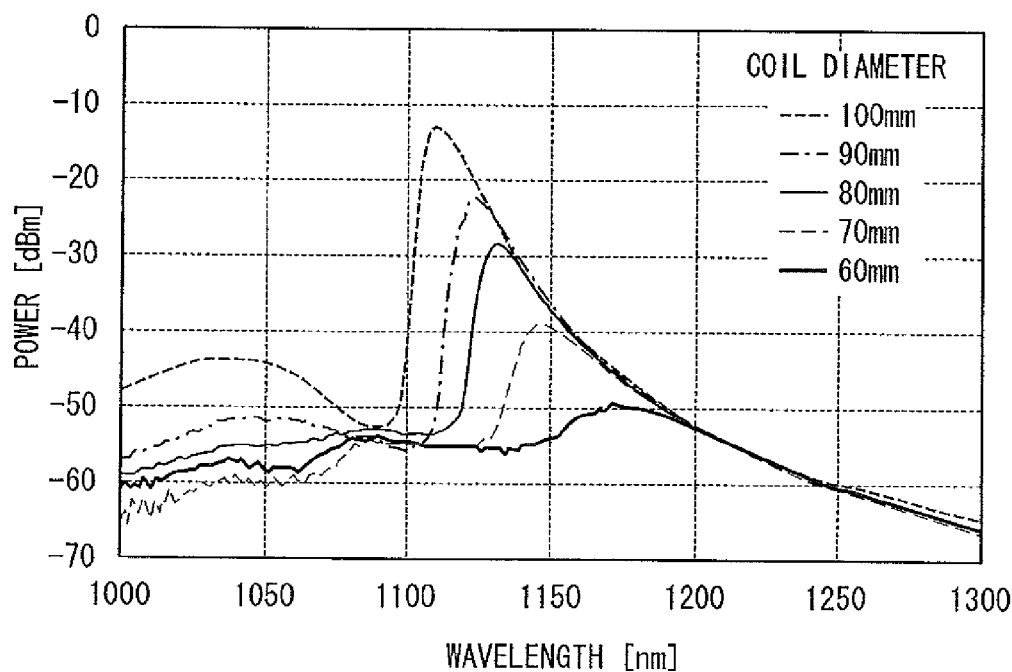
FIG. 13B is a diagram when an ASE spectrum of the optical fiber used in Example 4 is measured.

Next, the optical fiber of the present example was used to build an optical fiber laser similarly to Example 1. This was used as an optical fiber laser of Example 4. The optical fiber used had a length of 19 m, with the diameter around which the optical fiber was modified was changed from 60 mm to 100 mm. The optical fiber laser of Example 4 was used to measure ASE spectra. The results are shown in FIGS. 13A, 13B. FIG. 13A shows a result when six semiconductor lasers with an oscillation wavelength of 915 nm and a maximum output of 0.45 W were used as excitation light sources. FIG. 13B shows a result when six semiconductor lasers with an oscillation wavelength of 915 nm and a maximum output of 2.2 W were used as excitation light sources.

As shown in FIGS. 13A, 13B, it was possible to suppress ASE with wavelengths around 1030 nm. Furthermore, the smaller the diameter around which the optical fiber was wound was, the more effectively it was possible to suppress ASE, and also the further on the long wavelength side the peak of ASE shifted. From FIGS. 13A, 13B, it has been found that, even if the output of the excitation light source is changed, it is possible to control the gain profile of the optical fiber by changing the size of the diameter around which the optical fiber was wound.

INDUSTRIAL APPLICABILITY

The present invention is applicable to an optical fiber laser capable of stably emitting pulses with high energy.

The invention claimed is:

1. An optical fiber laser comprising: a master oscillator which is a laser oscillator producing a seed beam; and a power amplifier which is an optical amplifier connected to a subsequent stage of the master oscillator and amplifying the seed beam emitted from the master oscillator and outputting a laser beam, wherein the master oscillator comprises:
an excitation light source;
a WDM coupler that is connected to the excitation light source for combining an excitation light from the excitation light source with a laser beam;
an optical fiber connected to the WDM coupler;
an output coupler connected to the optical fiber; and
an isolator, wherein the WDM coupler, the optical fiber, the output coupler, and the isolator are connected in this order in a ring, wherein the optical fiber has a loss wavelength characteristic in that a photonic bandgap region is narrower than a gain wavelength band in a graph with an axis of abscissa representing a wavelength and an axis of ordinate representing a loss amount, and wherein the optical fiber comprises:
  a region;
  a core portion made of a solid material doped with a rare-earth element, provided in the region, and having a higher refractive index than the region;
  a first cladding provided around the region; and
  a periodic structure portion in which a multitude of high refractive index portions with a refractive index higher than that of the first cladding are arranged in a periodic structure portion being provided in a vicinity of the region in the first cladding.

2. The optical fiber laser according to claim 1, wherein a maximum relative index difference of the high refractive index portion is 2% to 3% with respect to the first cladding.

3. The optical fiber laser according to claim 1, wherein the core portion is higher than the periodic structure portion in electric field distribution of light with wavelengths in the photonic bandgap region; and the periodic structure portion is higher than the core portion in electric field distribution of light with wavelengths outside the photonic bandgap region.

4. The optical fiber laser according to claim 1, wherein at least germanium is included in the high refractive index portion.

5. The optical fiber laser according to claim 1, wherein the core portion is doped with Al or Ge.

6. The optical fiber laser according to claim 1, wherein the core portion has a relative index difference of approximately 0.1 to 0.5% from the region.

7. The optical fiber laser according to claim 1, wherein a maximum gain wavelength region of the optical fiber doped is excluded from a bandgap region.

8. The optical fiber laser according to claim 1, wherein an optical loss is inflicted on light which is guided through the core portion in wavelength region outside the photonic bandgap.

9. An optical fiber laser comprising: a master oscillator which is laser oscillator producing a seed beam; and a power amplifier which is an optical amplifier connected to a subsequent stage of the master oscillator and amplifying the seed beam emitted from the master oscillator and outputting a laser beam, wherein
  the master oscillator is the master oscillator according to claim 1, and
  the power amplifier comprises:
  a plurality of excitation light sources;
  excitation ports each of which is connected to the excitation light sources and which an excitation light emitted from each of the excitation light sources enters;
  a signal port which the seed beam emitted from the master oscillator enter;
  an optical coupler with an exit port that outputs the excitation lights from the excitation port together with the seed beam from the signal port; and
  an optical fiber connected to the exit port.

* * * * *